United States Patent
Upendran et al.

(10) Patent No.: US 7,680,804 B2
(45) Date of Patent: Mar. 16, 2010

(54) SYSTEM AND METHOD FOR NAVIGATING AND INDEXING CONTENT

(75) Inventors: Manish Upendran, San Jose, CA (US); Laurence Mann, San Jose, CA (US); Ryan King, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 223 days.

(21) Appl. No.: 11/473,727

(22) Filed: Jun. 22, 2006

(65) Prior Publication Data

US 2007/0156719 A1    Jul. 5, 2007

Related U.S. Application Data

(63) Continuation-in-part of application No. 11/322,663, filed on Dec. 30, 2005.

(51) Int. Cl.
*G06F 7/00* (2006.01)
*G06F 17/30* (2006.01)

(52) U.S. Cl. .................... 707/100; 707/204

(58) Field of Classification Search .............. None
See application file for complete search history.

(56) References Cited

U.S. PATENT DOCUMENTS

| 6,990,498 B2 * | 1/2006 | Fenton et al. ............ 707/102 |
| 2005/0114704 A1 * | 5/2005 | Swander .................. 713/201 |
| 2006/0221208 A1 * | 10/2006 | Minami ................ 348/231.2 |
| 2006/0277205 A1 * | 12/2006 | Song et al. .............. 707/102 |

* cited by examiner

*Primary Examiner*—Don Wong
*Assistant Examiner*—Belinda Xue
(74) *Attorney, Agent, or Firm*—Seth H. Ostrow; Ostrow Kaufman & Frankl LLP

(57) ABSTRACT

According to one embodiment, a content data store maintains the one or more content items in accordance with a programmable indexing schemes, with each container in the comprising storage for one or more references to one or more content items. Systems and methods are provided that re-index the references to content items that the content data store is indexing in accordance with one or more container creation schemes for ease of management and navigation.

10 Claims, 16 Drawing Sheets

SYSTEM AND METHOD FOR NAVIGATING AND INDEXING CONTENT

The present application is a Continuation-in-Part of U.S. patent application Ser. No. 11/322,663, entitled "SYSTEM, METHOD AND FRAMEWORK FOR UNIVERSAL ACCESS TO CONTENT AND SERVICES," filed on Dec. 30, 2005 and assigned the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to systems, methods and frameworks for accessing content and services in a location independent manner from arbitrary devices attached to a network. More specifically, the present invention relates to systems, methods and frameworks for providing access to content and services located on a local network, a content and service provider's system on a wide area network, or a third party system on a wide area network from arbitrary devices attached to a network to local and in communication with a wide area network.

BACKGROUND OF THE INVENTION

Currently, users may employ client devices such as personal computers (PCs), PDA's, smartphones, etc. with access to wide area networks, e.g., the Internet, to share content from various online services. Using a PC, a user may access content and services including, but not limited to, music and video downloads, photo sharing, and information access, e.g., news, weather, sports, financial content, etc. Additionally, providers of content and services allow users to create personal profiles to indicate preferences with regarding to the content and services that they wish to receive, as well as from communities of users for the exchange of content and services.

In addition to the growth in the use of networked personal computing devices, there has also been significant growth in the deployment of local area networks that provide computing devices with access to wide area networks, for example, a local area network within the home connected to a wide area network such as the Internet to provide computing devices within the home with access to the Internet in addition to local resources. Similarly, there has been significant growth in the deployment of media access devices, such as digital media adapters, set-top boxes, Internet appliances, etc., which are also connected to local area networks. There is currently no way, however, to extend access to content and services from a variety of sources to popular media access devices in a seamless manner. Furthermore, there are no systems or techniques for extending access to content and services from a variety of sources while retaining user preferences and community identity.

With the proliferation of content items available on local and remote networks, it has become increasingly difficult for a user to locate particular content items on a display limited UPnP client device where the number of content items exceeds a certain threshold. In the case of devices that support UPnP AV Search, the device or application can search for a specific subset of items based on a set of rules. This inherently limits the number of items that are displayed on the device. In the case of devices or clients that do not support UPnP AV Search, however, this flexibility is not available, making the navigation extremely frustrating to the user.

Accordingly, there is a need for systems, methods and program code that provide enhanced formatting and indexing of content such that a minimum number of choices is required by a user to locate a desired content item, irrespective of the amount of content in the content management system.

SUMMARY OF THE INVENTION

The present invention is directed towards systems, methods and program code for providing re-indexing content items made available by one or more UPnP servers or services. A method according to one embodiment of the present invention comprises creating a container for the storage of one or more references to one or more content items, creating a new container within the container in accordance with a container creation scheme and copying one or more links to the one or more references to the new container. The method may further comprise determining a need for another new container. Where there is a need for the another new container, creating the another new container within the container in accordance with the content creation scheme and copying one or more links to the one or more references to the new container.

A container creation scheme may determine the hierarchy of containers that are created within content management system, which may be stored as one or more indexes, e.g., one or more XML files. A content creation scheme may be selected from the set of content creation schemes including alphabetical, chronological, date, resolution and size. Copying comprises copying in accordance with one or more content item properties selected from the set of properties including file name, artist name, genre type, playlist name and podcast name. Copying may also comprise copying a reference to a given content item in multiple containers.

As indicated above and described herein, containers may be created in accordance with one or more container creation schemes. A container creation scheme may be determined by a number of sources, e.g., a content provider. Similarly, properties received from a content provider may be used to determine a container hierarchy for a CMS. Alternatively, or in conjunction with the foregoing, one or more user preferences may be utilized to determine the content creation scheme. Also, one or more properties of a client device may be used to determine the content creation scheme.

A content management system may utilize one or more rules to generate a content creation scheme. The content management system may utilize rules available on one or more local or remote storage devices, which may be dynamically applied upon receipt of a request from a client device. According to one embodiment, a content management system conforms to and implements the specification of a UPnP AV content directory ("CDS").

BRIEF DESCRIPTION OF THE FIGURES

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
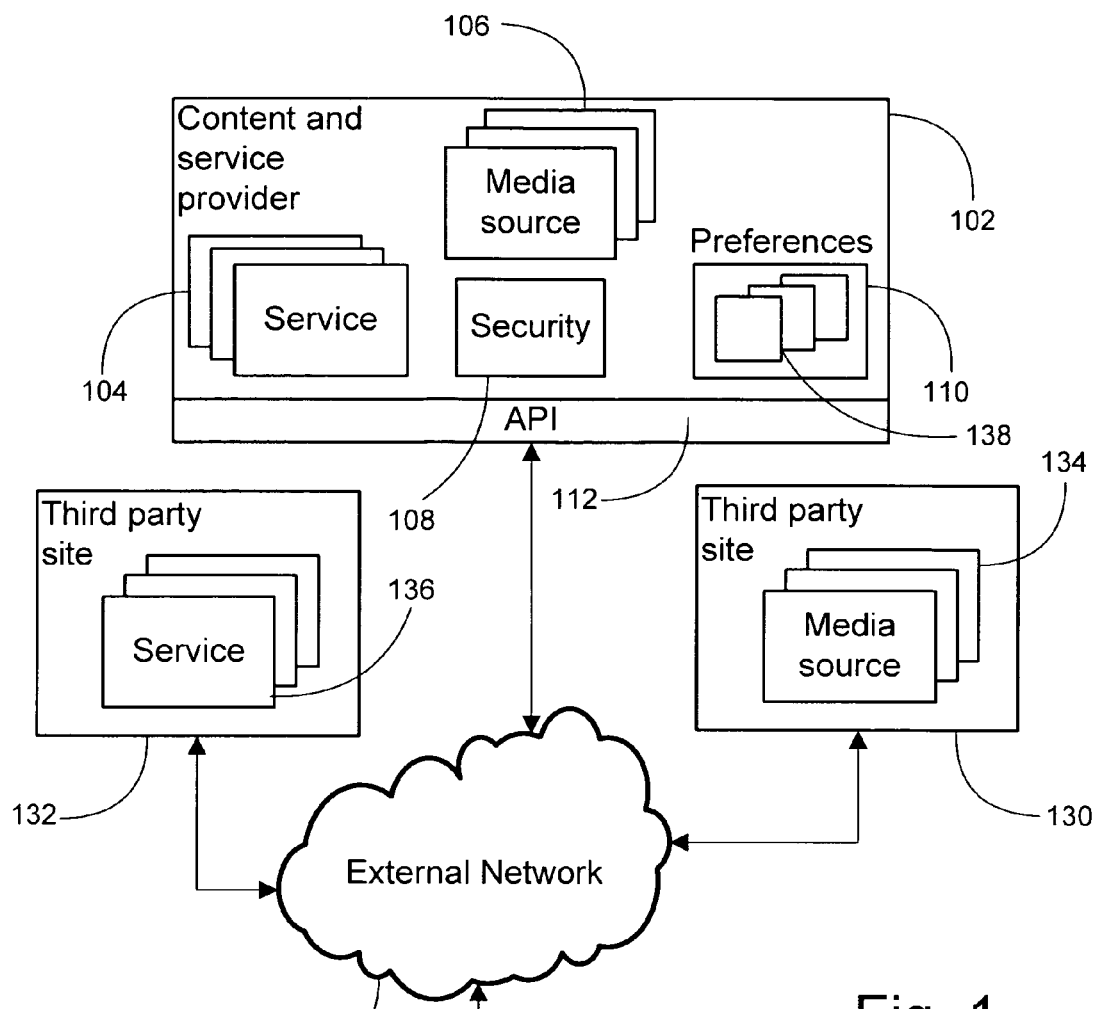
FIG. 1 is a block diagram illustrating a high level system for providing universal access to media and services according to one embodiment of the present invention.
Figure 1:
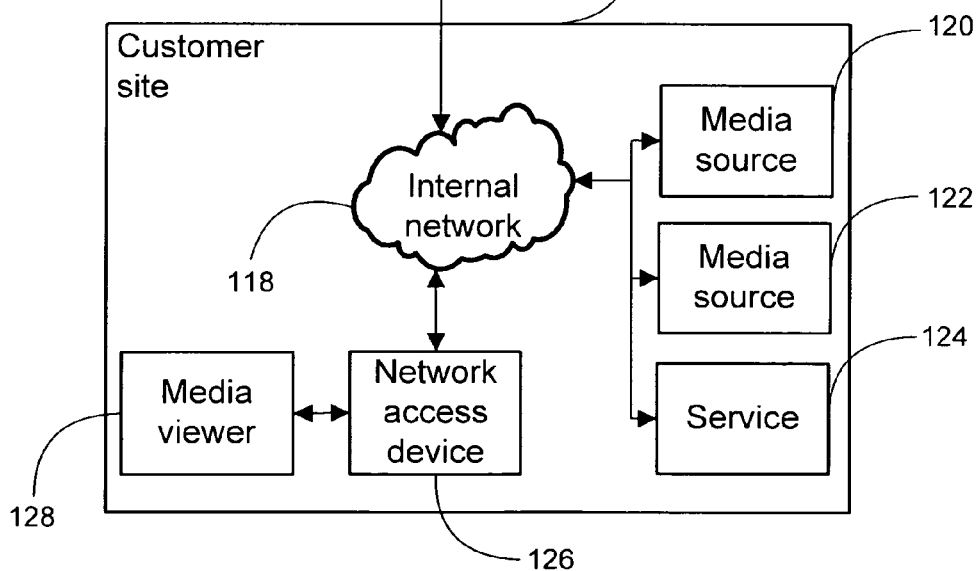

With reference to FIGS. 1 through 12, embodiments of methods, systems and frameworks according to the present invention are presented. Referring to FIG. 1, a system for providing universal access to content and services generally includes a content and service provider 102, a customer site 116 and one or more third party sites, 130 and 132, respectively, all of which are in communication over an external network 114.

The content and service provider 102 is one source of content and services for consumption by a user, which may be consumed at a customer site 116. The content and service provider 102 comprises one or more services 104, one or more media sources, a security sub-system 108 and a preferences sub-system 110. The content and service exposes a set of functions through an Application Program Interface ("API") 112 which, as is described in greater detail herein, the user may invoke to access the services 104, media 106, security 108 and preference 110 functions of the content and service provider 102. The security sub-system 108 controls access to the services 104 and media sources 106 at the content and service provider 102, for example, through the use of unique username and password credentials for each user accessing the content and service provider 102.

The preferences sub-system 110 allows a user to create a preference profile. The preference profile identifies one or more preferences of a user. Information in a preference profile includes, but is not limited to, preferred services and media sources at the content and service provider, formatting and presentation of information that the user prefers, and addressing information for local services and media sources. The preference profile may also indicate one or more communities to which the user belongs, or identify one or more other users of the content and service provider with whom a given user maintains a trusted relationship. According to one embodiment, the preference sub-system 110 is a relational database management system ("RDBMS") that maintains one or more records for each user, with one or more given records comprising preference information for a given user. It should be appreciated by those of skill in the art that use records may be stored according to a number of data storage techniques, e.g., a file system or in a memory structure distributed across multiple devices.

A user at a customer site 116 may maintain one or more media sources 120 and 122, in addition to running one or more services 124. Media sources 120 and 122 and services 124 operating at the customer site 116 may be in communication with an internal network 118 such that other devices 126 on the local network may access the sources 120, 122 and services 124. According to one embodiment of the invention, the user may register or indicate the existence, address or other identifying information for local media 120, 122 and services 124 in his or her preference profile that the preference sub-system 110 maintains.

The user employs a network access device 126 in communication with the internal network 118 to access local media 120, 122 and services 124. The network access device 126 is coupled with a media viewer 128. The network access device 126 accesses local media 120, 122 and services 124 over the internal network 118 for presentation on the media viewer 128. The network access device 126 may also be in communication over the internal 118 and external 114 networks with the content and service provider 102 to access services 104 and media sources 106 at the content and service provider 102. The network access device, therefore, has unified access to local media 120, 122 and services 124 as well as remote services 104 and media 106. According to one embodiment of the invention, the content and service provider 102 provides access to the services 104 and media 106 according to a user's preference profile that the preference sub-system 110 maintains.

As described above, a user may indicate that he or she is a member of a community of users in the preference profile that the preference sub-system 110 maintains. Users in the community may operate third party sites 130, 132 that provide media and services, 134 and 136, respectively. It should be appreciated by those of skill in the art that each third party site may host combinations of one or more media source and services. Users of third party sites 130, 132 also create preference profiles using the preference sub-system 110 that indicate membership in one or more communities, as well as the address of any local media 134 or services 136 that they host.

Therefore, a given user's preference profile that the preference sub-system 110 maintains identifies the user's local media 120, 122, and services 124, preferences with regarding to services 104 and media 106 that the content and service provider 102 is offering, and other individuals operating third party sites 130, 132 that are within a given community with the user.

A user controlling a network access device 126 may provide the user with unified access to media and services that are local to the customer site, e.g., over the internal network, as well as services and media that are remote to the customer site. The user's preference profile provides information that identifies the local and remote media and services. The advertisement and discovery of both local and remote media and services may operate according to standards based mechanisms, as is described in greater detail herein.

Figure 2:
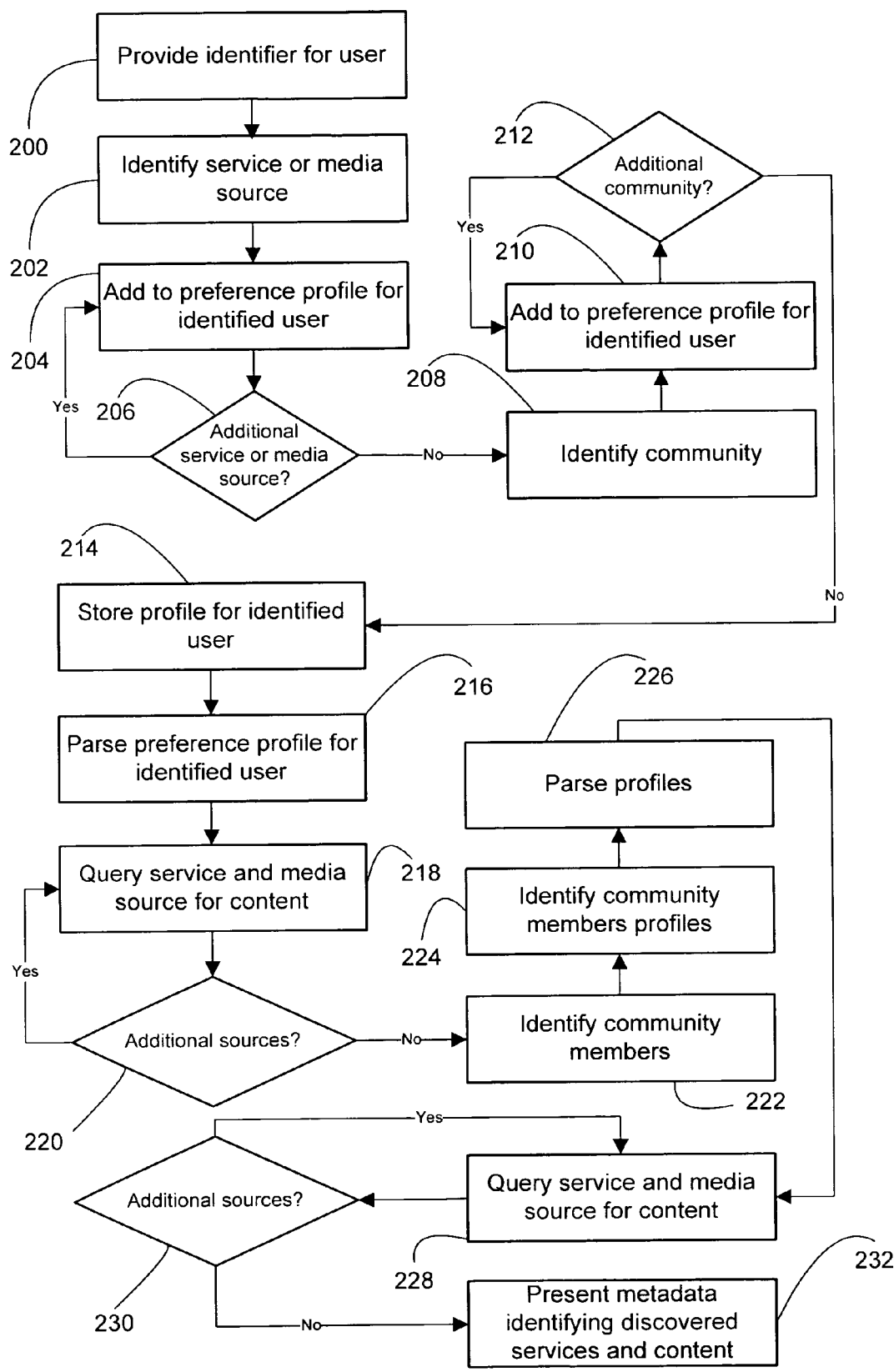
FIG. 2 is a flow diagram illustrating a method for the creation and use of a preference profile for providing universal access to media and services according to one embodiment of the present invention.

FIG. 2 illustrates a method for a user to create a preference profile identifying remote and local services and media sources for providing universal access to media and services according to one embodiment of the present invention. The method begins with the identification of a given user for which discovered content and services are to be presented, step 200. For the given user, a service or media source is identified, step 202 and added to the preference profile for the identified user, step 204. A check is performed to determine if additional services or media sources exist for the identified user, step 206. Where additional services and media sources exist, step 206, the additional service or media sources is added to the preference profile for the identified user, step 204.

Where no additional services or media source exist for the identified user, step 206, a community of users related to the identified user are determined, step 208. The community of users may be those users with whom the identified user maintains a relationship. According to one embodiment, the identified community is retrieved from a buddy list for the identified user. An identified community member is added to the preference profile for the identified user, step 210, and a check is performed to determine if additional community member exist, step 212. Where no additional community members exist, the profile for the given user is stored to a data store, which may be any combination of transient or persistent memory devices.

The preference profile for the identified user is parsed to determine the identified user's service and media sources, step 216, which are queried to determine the content available from a given service or media source, step 218. A check is performed to determine whether additional services or media sources exist, step 220, which are also queried to determine the content made available from the additional services or media sources, step 218. Where no additional service or media sources exist, step 220, community members for the identified user are determined by accessing the stored profile, step 222. Profiles for the members in the community with the identified user are retrieved, step 224, which are parsed to determine the services or media sources made available by a given community member, step 226.

The preference profile for a given community member is parsed to determine the given community member's service and media sources, step 226, which are queried to determine the content available from a given service or media source, step 228. A check is performed to determine whether additional services or media sources exist, step 230, which are also queried to determine the content made available from the additional services or media sources, step 228. Where no additional service or media sources exist, step 230, metadata is presented to the user identifying discovered service and content, step 232, which include both content made available from the identified user's services and media sources as well as content made available from services and media sources of the identified user's community members.

Figure 3A:
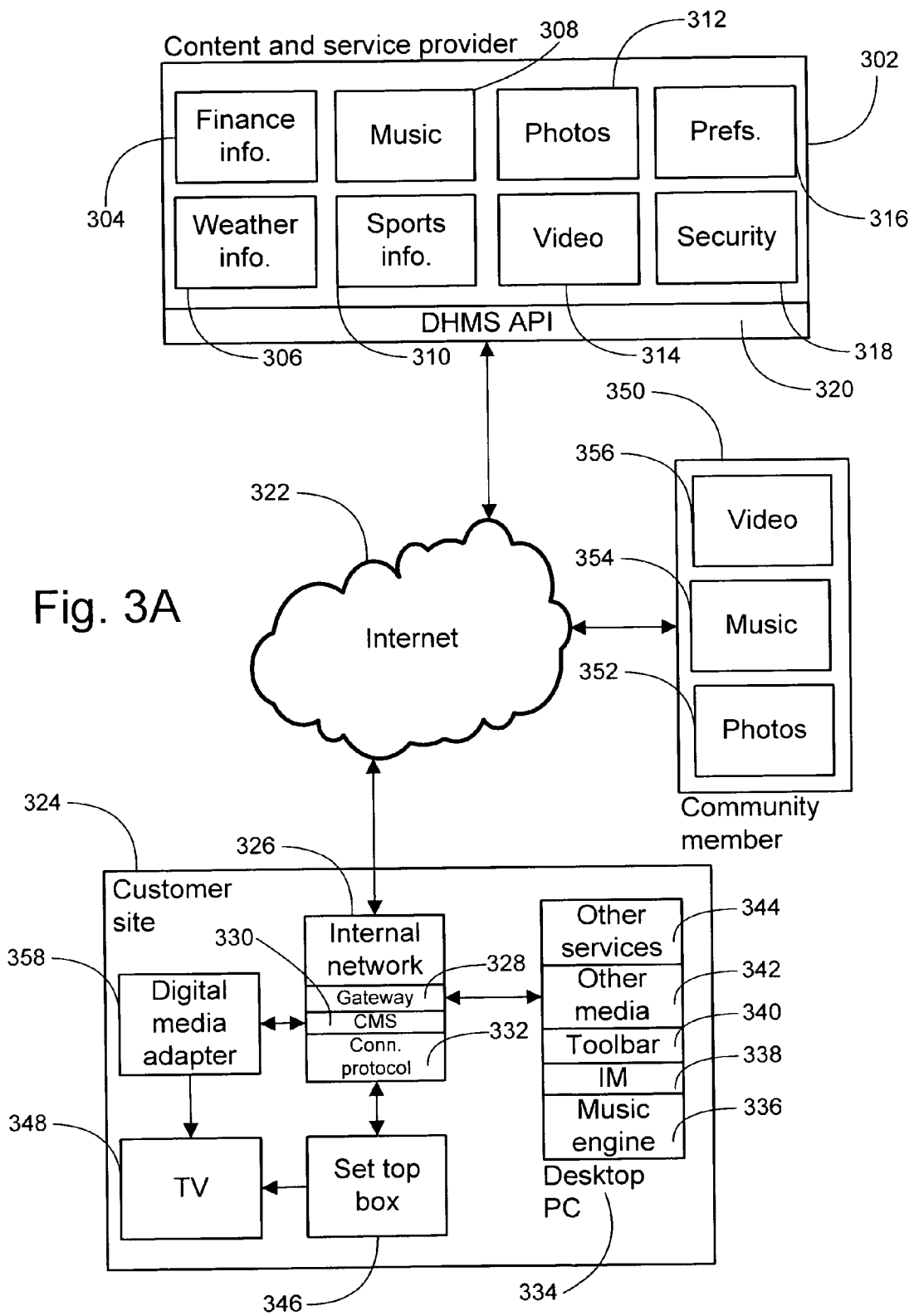
FIG. 3A is a block diagram illustrating a detailed system for providing universal access to media and services according to one embodiment of the present invention.

FIG. 3A presents block diagram illustrating a detailed system for providing universal access to media and services according to one embodiment of the invention. According to FIG. 3A, a content and service provider 302 provides access to one or more services and media sources. For example, services made available by the content and service provider 102 include, but are not limited to finance information services 304, weather information services 306 and sports information services 310. Similarly, media sources made available by the content and media service provider 102 include, but are not limited to, music 308, photos 312 and video 314. According to one embodiment of the invention, the content and media service provider is the MyYahoo! service, which provides access to services and media sources. The content and service provider 302 implements a digital home media service ("DHMS") API that exposes functions that allow access to the content and service provider's services 304, 306, 310 and media 308, 312, 314.

A security subsystem 318 controls access to the services 304, 306, 310 and media sources 308, 312, 314 that the content and service provider 302 makes available. Similarly, the security sub-system 302 controls access to the preference profile sub-system 316 and the substantive preference profile information. According to one embodiment, a call is made from the DHMS API 320 to the security sub-system 318 when a user attempts to access the preference profile sub-system 316, services 304, 306, 310 or media sources 308, 312, 314 at the content and service provider 302. The security sub-system 318 validates the user before providing access. Alternatively, a call is made from the DHMS API 320 to the security sub-system 318 when a user initially attempts to access a function of the API 320. The security sub-system validates the user and records an indication of the validation, e.g., through the use of a cookie or similar technology known to those of skill in the art, which may persist for the duration of the user's session. The security sub-system may validate the user according to one or more techniques know to those of skill in the art including, but not limited to, username and password, physical token, etc.

According to one embodiment, the services 304, 306, 308 and media sources 310, 312, 314 that the content and services provider 302 offers may be customized according to a user's preference profile. A preference sub-system 316 maintains preference profiles for one or more users of the system. The preference profile may be used to establish recommendations, favorites, and various other personal preferences on a per-user basis. This may include, for example, recommendations on a favorite radio station, information regarding current stocks in a user's stock portfolio, specific weather information on the basis of a user's area or zip code, favorite sports teams, favorite TV programs or genres, favorite movies or genres, favorite music or genres, etc. A user's preference profile may also comprise information regarding one or more communities to which the user belongs, which provides access to the preferences of other individuals in the community. Information regarding one or more communities to which the user belongs may be the basis for generating recommendations regarding media and services in which the user may be interested, as well as other media and services to which the user may be provided access.

According to the present embodiment, a customer site 324, which may be the home in which a user reside, comprises a desktop PC 334, an internal network 326, a set top box 346, a digital media adapter 358 and a television 348. The desktop PC 334 maintains one or more services and media sources. For example, the desktop PC 334 may maintain a music engine service 336 that provides access to music content, an instant messaging service 338 that allows the user to exchange instant messages with other users over combinations of the internal network 326 and the Internet 322 and a toolbar service 340, which may provide searching services, as well as access to the services 304, 306, 310 and media sources 308, 312, 314 of the content and service provider 302. According to one embodiment of the invention, the toolbar service 340 is the Yahoo! toolbar service, the instant messaging service is the Yahoo! instant messenger service and the music engine service is the Yahoo! music engine. The desktop PC 334 may also provide additional media 342 and services 344 as are well known to those of skill in the art, such as electronic program guide ("EPG") services and content searching services.

The desktop PC 334 is coupled to and in communication with an internal network 326 that provides a communications channel for devices within the customer site 324. The internal network is in communication with a wide area network, such as the Internet 322, to provide a communications channel to the content and service provider 302. The internal network 326 comprises a gateway 328, a content management system ("CMS") 330 and a connection protocol 332. The gateway 328 provides connectivity between the internal network 326 and the Internet 322.

The CMS 330 provides directory services for other devices on the internal network, e.g., a set top box 346 or digital media adapter 358, allowing those devices to identify and access services and media sources that are both local and remote to the customer site 324. The CMS 330 works in conjunction with the connection protocol 332 to allow devices to be attached to the internal network 326 and access local and remote services and media sources in an ad-hoc fashion. It should be noted that according to certain embodiments the internal network, including the gateway, CMS and connection protocol may be implemented in a single device, such as SOHO firewall/router/gateway device that implements the CMS and connection protocol. According to one embodiment, the content and service provider 302 provides the CMS 330 with preference profile information from the preference sub-system 346 via the DHMS API 320. The CMS 330 uses the preference profile information to identify specific services and media sources that are available to devices on the internal network 326, such as a set top box 346 or digital media adapter 358.

A number of suitable connection protocols that are known to those of skill in the art may be implemented in the internal network including, but not limited to, universal plug and play ("UPnP") and Bonjour (formerly known as Rendezvous), developed by APPLE COMPUTER, INC. Peer-to-peer sharing of services and media sources over the internal network and Internet are made possible using the CMS and connection protocol. According to one embodiment, the connection protocol initiates a discovery process to initiate peer-to-peer communication between one or more services. For example, a peer-to-peer communication may be initiated between a first instant messenger client communicating with a second instant messenger client or a music client. Advantageously, the CMS and connection protocol effectively separate data delivery from the user experience by allowing for consumption of content by arbitrary consumers with varying rendering capabilities. For example, a UPnP-enabled single-line display stereo system may be delivered the same audio data a digital media adapter that is capable of displaying photos and video in addition to audio content.

In addition to the content and service provider 302, services and media sources owned by community members 350 are made available to the user. Using the preference profile sub-system 316, a user may indicate one or more communities to which the user belongs, or one or more community members with which the user maintains a trusted relationship. A community member 350 may also use the preference profile sub-system 316 to create preference profiles, which may include addressing information for one or more services or media sources 325, 354, 356 that the community member maintains. Links or entries in the user's preference profile indicate a connection between the user and community member, which exposes addressing information for the community member's services and media sources to the user. The CMS 330 operating at the customer site 324 retrieves metadata representing content choices that may be generated from the user's preference profile information, which contains preferences or addressing information for the community member's services and media sources, to present service and media source choices to the user through the use of the set top box 346 or digital media adapter 358.

A set top box 346 or digital media adapter 358 is coupled to and in communication with the internal network 326. The CMS 330 and connection protocol 332 control discovery of services and media sources by the set top box 346 or digital media adapter 358. The CMS 330 provides the set top box 346 or digital media adapter 358 with information regarding available services 334, 336, 338, 344 and media sources 342 attached to the local network 326, as well as services 304, 308, 310 and media sources 308, 312, 314, 325, 354, 356 available through community members 350 and the content and service provider 302. According to one embodiment, this information is provided to the CMS from the user's preference profile, which is accessed through the functions exposed by the DHMS API. The CMS 330 provides the service and media source information to the set top box 346 or digital media adapter 358 for display on a television 348 as a unified set of information without regarding to the specific location or address of a given service or media source.

Figure 3B:
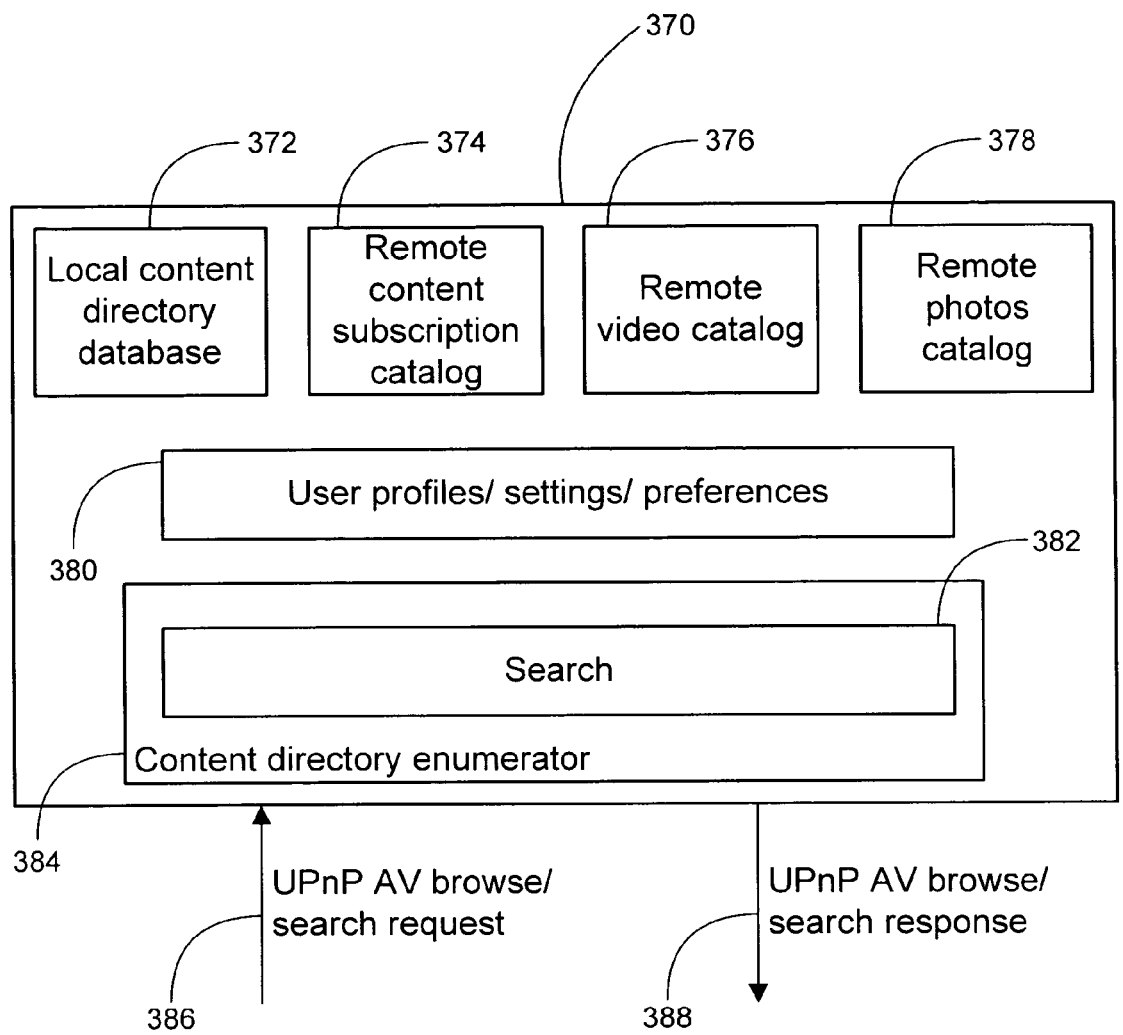
FIG. 3B is a block diagram illustrating a system for searching media according to one embodiment of the present invention.

According to one embodiment of the invention, the content management system provides users with search functionality that allows for the identification of content and services that are responsive to one or more search criteria. FIG. 3B presents the content management system 370 that provide search functionality. The content management system 370 organizes one or more content items or links to content items, which may reside on a local network with the content management system 370 or remote to the content management system 370, e.g., over the Internet. According to the embodiment of FIG. 3B, the content management system 370 organizes local content in a local content directory database 372, remote subscription content in a remote content subscription catalog 374, remote video in a remote video catalog 376 and remote photos in a remote photo catalog 378. It should be noted by those of skill in the art that other content sources, including local, remote and subscription sources may be managed by the content management system 370. Furthermore, the content management system may maintain combinations of content items and links to content items.

The content management system 370 also maintains one or more user profiles 380, which may identify settings and preferences for a given user. For example, a user profile 380 for a given user may identify the given user's local content for management by the content management system 370, one or more subscription services to which the given user subscribes and content for users in the given user's social network to which the given user has access. The user profile 380 may also identify setting and preferences for the given user including, but not limited to, ratings for content items, the identity of any users in the given user's social network, preferred content items or genres of content, etc.

In addition to the foregoing, the content management system 370 maintains a search component 382 that allows a given requester to conduct searches for content and services 372, 374, 376, 378 managed by the content management system 370 based on the stored user preference profiles. The search component 382 utilizes a content directory enumerator 384 that provides translation services. The content management system 370 receives a UPnP AV browse or search request 386 from a client device for a given user. The content directory enumerator 374 receives the request 386, which the enumerator 374 translates into a format that the search component 382 may utilize. For example, the content directory enumerator 384 may be operative to receive requests 386 according to a number of formats or protocols, e.g., UPnP, Bonjour, etc., and translate a given request 386 into a canonical format that the search component 382 may utilize. The search component 382 receives a translated request from the content directory enumerator 384 and parses the request to identify the search criteria, which allows the search component 382 to identify the proper content data store 372, 374, 376, 378 and content for the user. The search component 382 packages the response as links to the identified content and associated metadata for transmission to the requester, which may include the content directory enumerator translating the response into a UPnP AV browse or search response 388. Accordingly, users may search for and identify content and services that the content management system 370 maintains.

Figure 4:
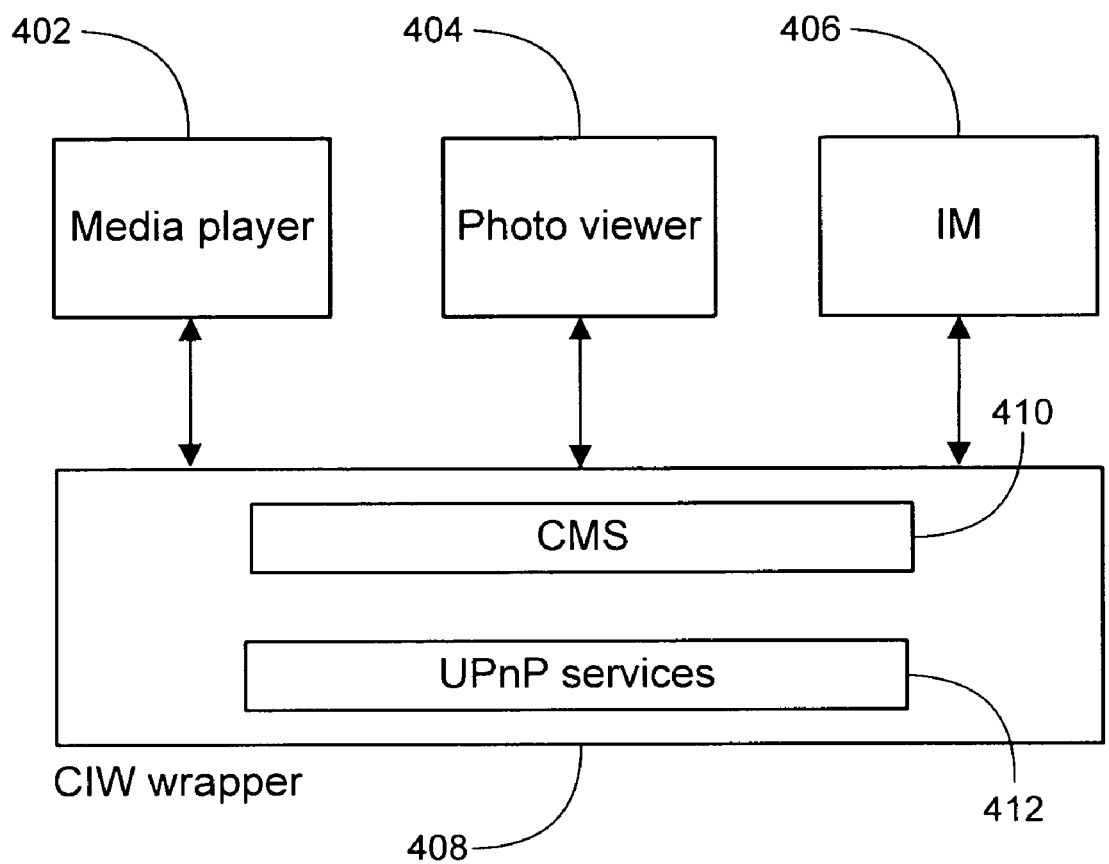
FIG. 4 is a block diagram illustrating an interface providing universal access to media and services according to one embodiment of the present invention.

FIG. 4 illustrates one embodiment of an interface for services and media sources, both local and remote to the customer site, to expose services and media sources to devices on the internal network of the customer site. According to one embodiment, the CMS satisfies the requirements to behave as a UPnP content directory service ("CMS") 410 and the connection protocol is implemented using UPnP 412. It should be appreciated by those of skill in the art that the CMS 410 may provide connections for and communicate according to multiple protocols and deliver content according to multiple service types, e.g., UPnP AV and Rendezvous. According to one embodiment, interfaces and callbacks to the CMS 410 are implemented via a common interface wrapper ("CIW") 408. According to an alternative embodiment, the CIW is implemented by exposing the appropriate interfaces via COM. It should be appreciated that the CIW may be implemented according to other techniques known to those of skill in the art, such as CORBA, Enterprise Java Beans ("EJB"), etc.

Services and media sources, such as a media player 402, photo viewer 404 and instant messenger 406 access the CMS 410 through interfaces exposed via the CIW 408. Services and media sources 402, 404, 406 interested in providing content metadata access the CMS 410 and "publish" content for viewing by other compatible devices. According to one embodiment, the CMS 410 receives the information for publication and advertises the content to all UPnP devices on a local network through the use of UPnP services 412. The architecture provides UPnP capabilities to services and media sources 402, 404, 406 in a scaleable and reusable manner. Alternatively, the CMS 410 may query the services and media sources 402, 404, 408 for content metadata, which it advertises to devices on the network through the use of UPnP services 412.

Figure 5:
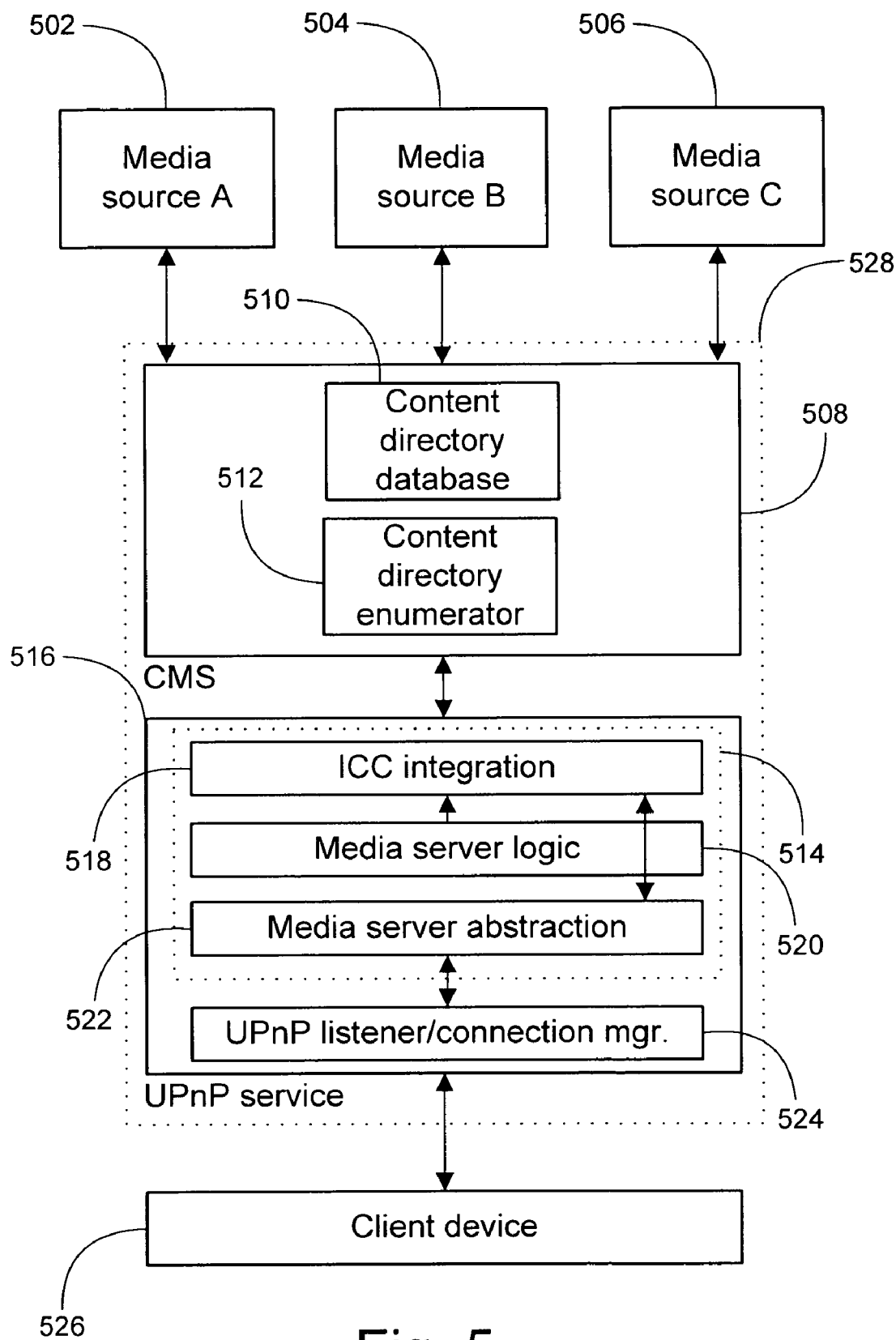
FIG. 5 is a block diagram illustrating an interface framework in conjunction with a UPnP server based on an Intel UPnP SDK for providing universal access to media and services according to one embodiment of the present invention.

The CMS 410 is agnostic to the actual location of the services and media sources for which it is publishing content. For example, the CMS 410 may publish media player services 402 located on the Internet, whereas it may also publish instant messenger services 406 located on the local network. According to one embodiment of the invention, the CMS 410 receives a user's preference profile, for example, from a content and service provider. The CMS 410 determines the services and media sources 402, 404, 406 to publish to the local network on the basis of information contained within the preference profile. By using a user's preference profile, the CMS may publish personalized services and media to the user's local network for viewing on UPnP devices including, but not limited to, set top boxes and digital media adapters FIG. 5 presents a block diagram illustrating an embodiment of a UPnP AV media server 528 providing a client device 526 with access to media sources 502, 504, 506, which may be on a local network with the client device 526 or located remotely over a wide area network. The UPnP AV media server comprises a content management system module 508 that provides access to one or more media sources 502, 504, 506, which may also include services. The content management system module 508 comprises one or more content directory enumerators 512 and content directory databases 510 for content metadata that the media sources 502, 504, 506 provide to the content management system service module 508. The content directory enumerators 512 contain one or more lists of enumerators that represent the media sources and services 502, 504, 506 that are available to the UPnP AV media server 528. Each registered enumerator may represent a separate metadata store. According to one embodiment, the content directory enumerator module 512 responds to metadata requests from the client device 526 via the UPnP service module 516, while allowing publication of metadata from the media sources and services 502, 504, 506, which is held in the module's storage 510.

The UPnP AV media server implements a UPnP services module 516 to provide UPnP services to media sources and services 502, 504, 506. The UPnP services module 516 comprises a UPnP listener/connection manager 524 and a translation layer 514. The UPnP listener/connection manager 524 is operative to listen for content and service requests that a client device 526 transmits over a network. For example, the UPnP listener/connection manager 524 may resolve and parse SOAP transaction headers and pass browse requests to the translation layer 514. The translation layer receives content and service requests from the UPnP listener/connection manager 524 and formats the requests for the retrieval of content and services by the CMS 508.

According to one embodiment, the translation layer 514 is based on the Intel UPnP SDK that is a modular and reusable framework such that clients designed to function within a home network may install the SDK, which thereby provides content to the UPnP network in a personalized manner. The translation layer 514 comprises a media server abstraction layer 522, media server logic layer 520 and an ICC integration layer 518. The MSA layer 522 may make a call back to the Intel content center integration ("ICC") layer 518, providing the browse request. According to one embodiment, the MSA layer is a single-threaded server that is primarily responsible for abstracting out the UPnP listener interfaces from the higher layers such as the ICC layer 518.

The ICC layer 518 may hand off the browse request to the media server logic ("MSL") layer 520 via an MSL callback mechanism. The MSL layer 520 may also be responsible for "eventing" all content requests back to the ICC layer 518 and receiving a fully constructed content directory object that reflects the request. The MSL layer 520 may make a call to convert the content directory object to a UPnP XML object using an XML descriptor language, such as DIDL-lite, and place it in a queue for asynchronous transmission to the client device 526. It should be noted by those of skill in the art that while the embodiment of FIG. 5 illustrates the content management system service module working in conjunction with a UPnP service module, the UPnP service module provides may be replaced with modules to provide connection services according to other connection protocols, such as Apple's Rendezvous zero-configuration network protocol.

Figure 6:
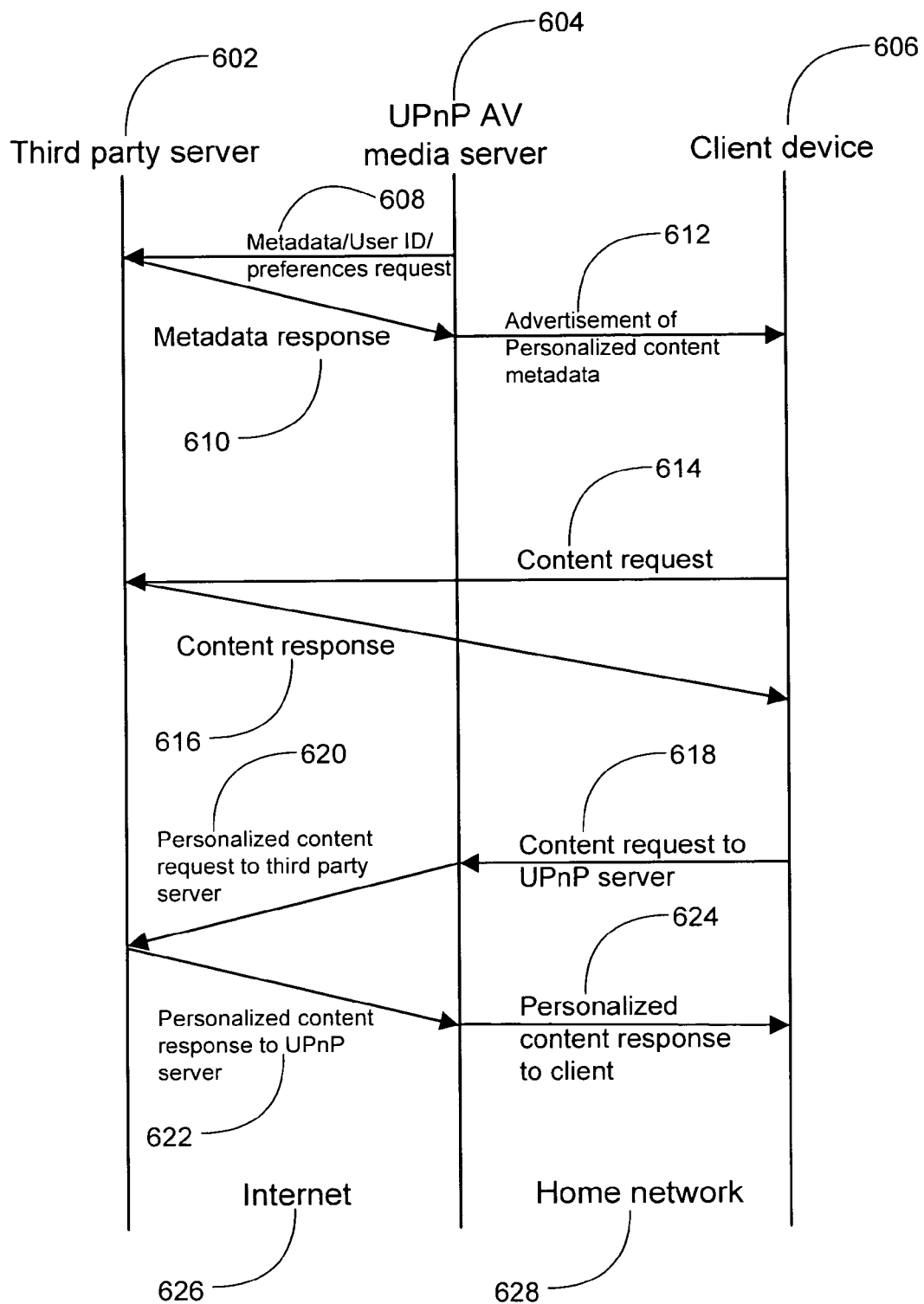
FIG. 6 is a swimlane diagram illustrating the interaction between a client, UPnP server and third party server according to one embodiment of the present invention.

FIG. 6 presents a swimlane diagram illustrating the interaction between a third party server 602, e.g., a content and service provider, a UPnP AV server 604 and a client device 606. According to the present embodiment, communication between third party servers 602 and the UPnP AV media server 604 may occur over the Internet 626, whereas communications between the UPnP AV media server 604 and client devices 606 occur over a home network 628.

A UPnP media server 604 issues a request for metadata, step 608, to one or more third party servers 602 for both authentication of the user and content access pertaining to a particular user. For example, the metadata request may request a play list of the user's personalized services and media sources be downloaded. The third party server 602 may respond to such a request that contains the appropriate authentication credentials, e.g., username and password, with content metadata by issuing a metadata response that is specific to the user making the request, step 610. The content data that the user has deemed appropriate for discovery may be published by the UPnP AV media server 604, and subsequently advertised, step 612, to client devices 606 on the home network 628 via a content directory service.

A client device 606 may discover and enumerate the content that the UPnP AV media server is advertising, steps 614 and 616. The client device may also discover renderers on the home network 628. Based on a user selection, the client device hands the URL of the content to an appropriate renderer for consumption. Alternatively, the client device may comprise the renderer, in which case the client device uses the URL of the content to appropriately render the asset. Where a fully qualified Internet URL identifies the content and the client 606 is capable of make requests over the Internet 626, the client 606 makes a direct request for content to the third party server 602 over the Internet 626, steps 614 and 616. The third party server may respond directly to the client 606, step 616, via transport streaming mechanisms known to those of skill in the art, such as HTTP, RTSP, etc.

For client devices 606 that are not capable of connecting to the Internet 626 and/or there is no capability to stream the content directly to the client device 606 due to user personalization, authentication, or other content protection considerations (e.g., digital rights management controls), the URL may be a logical URL that points back to the UPnP AV media server 604. Thus, a content request, step 618, may be issued to the UPnP AV media server 604, which resolves the logical URL to a physical URL, applies the user's authentication credentials and makes the content request to the third party server, step 620. The UPnP AV media server 604 receives the personalized content in the form of a content response, step 622, and streams the content to the client 606, step 624. According to this embodiment, music that comprises DRM access controls may be streamed to a client device 606.

According to an alternative embodiment, the content may reside on the UPnP AV media server 604, obviating the need to issue a request to the third party server 602. According to another embodiment, the third party server 602 may be a PC located on the home network 628. For example, assume that the client 606 is request a photo asset. The UPnP AV media server 604 resolves the request to a third party URL, retrieves the user's authentication cookie and presents both to the third party server 602 as part of a content request, step 620. The third party server 602 retrieves the photo that the client is requesting from the user's account and sends the photo information to the UPnP AV media server 604, step 622. The UPnP AV media server 604 sends the personalized response to the client 606, step 624, which displays the photo. It should be appreciated by those of skill in the art that the client is agnostic regarding the source of the photo and is not provided with information regarding where the photo resides or who owns the photo.

Figure 7:
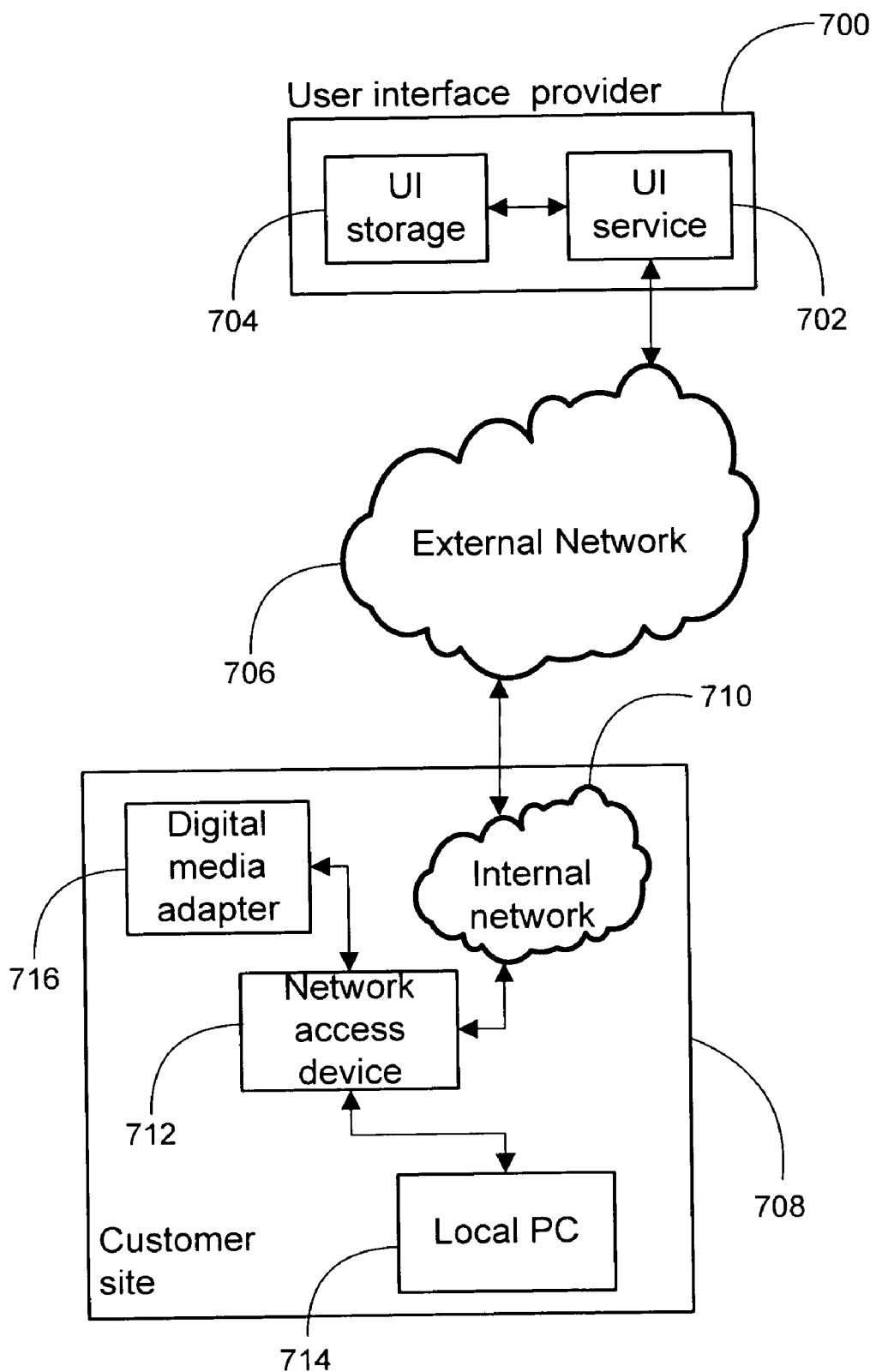
FIG. 7 is a block diagram illustrating a system for providing access to network based user interfaces according to one embodiment of the present invention.

As described above, the present invention provides for universal access to content and services, which includes network based user interface services. FIG. 7 presents a block diagram illustrating one embodiment of a system for providing access to network based user interfaces. According to the embodiment of FIG. 7, a user interface provider 700 comprises a user interface ("UI") service 702 and a data store for storage of UI content 704. The UI provider 700 is communicatively coupled to a network, such as an external network 706, which may comprise one or more local and wide area networks, e.g., the Internet. The UI service 702 at the UI provider 700 is operative to provide user interfaces to requesting clients. According to one embodiment of the invention, the UI service 702 receives requests for user interfaces, which the UI service 702 retrieves from the UI data store 704 for transmission to and display by requesting clients. Alternatively, or in conjunction, the UI service 702 may dynamically generate UI content using preference or profile data from one or more users, which may include UI content from the UI data store 704. Advantageously, the UI that the UI service 702 provides may be a "10 foot" UI suitable for display on a television or similar display device.

Connected to the external network 706 are one or more customers 708 of the UI provider 700. A given customer site 708 comprises an internal network 710, a network access device 712, a personal computer 714 that is local to the customer site 708 and a digital media adapter 716 or similar client device for requesting and displaying a user interface. The user employs the network access device 712 in communication with the digital media adapter 716 and local PC 714 to access one or more network based user interfaces made available by the UI provider 700. According to one embodiment, the system of the present invention is operative to provide a network based 10 foot UI to the digital media adapter using the UPnP frameworks described herein, e.g., the interface framework illustrated at FIG. 5.

The digital media adapter 716 initializes and attempts to communicate over the network access device 712 to locate one or more UPnP media servers, e.g., the Yahoo! Media Server. According to one embodiment, the digital media adapter 716 utilizes the standard UPnP XRT-2 eventing protocol, which is part of the UPnP remote UI specification. The digital media adapter 716 identifies one or more UPnP servers made available by the local PC 714 by way of the network access device 712. For example, the digital media adapter may connect to the Yahoo! Media Server that is being subscribed to by the Yahoo! Music Engine or Yahoo! Messenger. It should be noted that a give media server may provide multiple services. Accordingly, the UPnP server at the local PC 714 has access to the identity of the user and may access local or remote user profile data for the user.

The digital media adapter 716 issues a request to the local PC 714 for a user interface. According to one embodiment, the digital media adapter 716 issues a remote UI request to the PC 714 according to the remote UI XRT-2 protocol whereby software components at the local PC manage events that the digital media adapter 716 generates, although the system may utilize other protocols for requesting user interfaces know to those of skill in the art. The local PC 714 receives the UI request and attempts to access the UI service 702 of the UI provider 700 to retrieve a user interface. The local PC 714 may access the UI service 702 over the internal 716 and external networks 706 using any number of transmission protocols know to those of skill in the art, e.g., HTTP.

The local PC 714 receives a link to a user interface from the UI service 702, which the local PC 714 forwards to the digital media adapter 716. The local PC 714 may execute an HTTP redirect request to forward the link to the digital media adapter 716 via the network access device 712, as the local PC 714 is aware of the addressing or location information for the digital media adapter 716. The digital media adapter 716 uses the link that it receives from the local PC 714 to directly request the user interface from the UI service 702 via the network access device 712. In situations where the digital media adapter 716 does not have access to a communications channel to the external network 706, e.g., via the internal network 710, the local PC 714 may act as a proxy to forward the request to the UI service 702 at the UI provider 700. Advantageously, the local PC 714 does not perform any manipulation or transformation of the UI or UI content that the UI service 702 transmits to the digital media adapter 716, as the UI service 702 generates an appropriate network based UI for the digital media adapter 716, which may include the use of profile information previously described.

Figure 8:
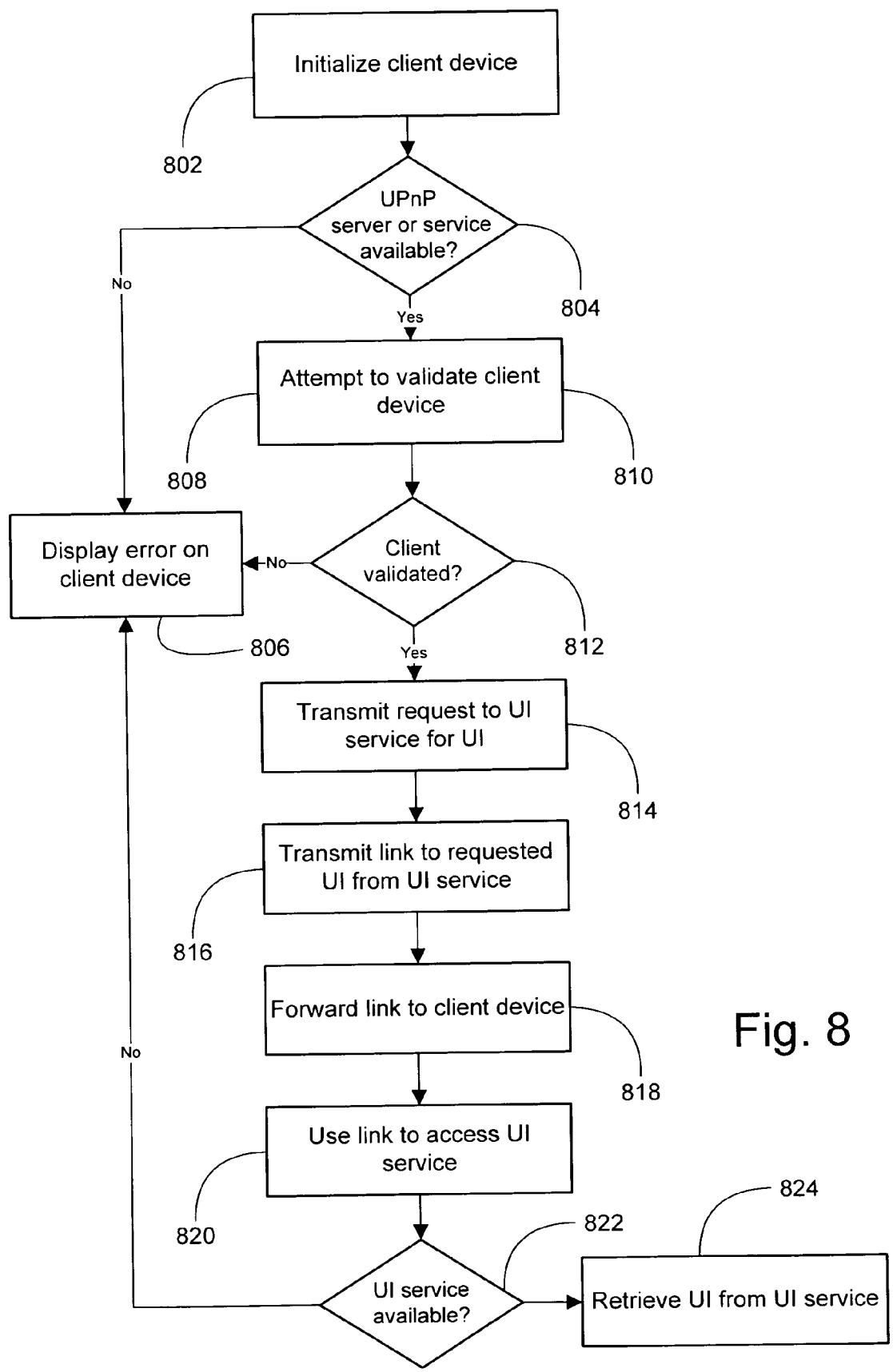
FIG. 8 is a flow diagram illustrating a method for providing access to network based user interfaces according to one embodiment of the present invention.

One embodiment of a method for using the present invention for the distribution of one or more user interfaces is illustrated at FIG. 8. The method begins with the client device initializing, step 802, which may include the client device broadcasting or transmitting descriptive information over a local network, e.g., where the client device is a UPnP digital media adapter, announcing the presence of the digital media adapter to UPnP services or servers available on the local network. A check is performed to determine if UPnP services or servers are available both locally and remotely, step 804, which may comprise a check to determine if a media server is available on the local network, e.g., Yahoo! Music Engine. Where there are no UPnP services or servers available to the client device, step 804, the client device displays an error message to the user indicating the lack or available UPnP services or servers, step 806.

An attempt may be made to validate the client device, step 812. For example, where the client device is connecting to or registering with one or more UPnP servers, which may be conducted according to techniques described herein, the UPnP server may validate that the client device may make a connection. As part of the validation step, the UPnP server may associate a user name, id or token with the client device such that the client device may receive one or more user interfaces that are customized for the user, in addition to generic user interfaces. Where the client device is unable to be validated, step 812, an error is returned to the client device for display to the user indicating that the UPnP server is unable to validate the client device, step 806.

Where UPnP servers or services are available to the client device, step 804, and the client device is successfully validated, step 812, a request is transmitted to a UI service or server for a user interface or UI content, which a UI service may use to generate a user interface, step 814. According to one embodiment, the client device issues a remote UI request to the client in accordance with the UPnP remote UI protocol specification that the local PC, which handles remote UI eventing on the local network, propagates to the UI service. The local PC may utilize any number of transmission protocols know to those of skill in the art, e.g., HTTP. The UI request may optionally comprise personalization information to allow the UI service to generate a customized UI. Alternatively, the request may comprise a user identifier that the UI service may use to access one or more user profiles when generating a customized user interface, e.g., profile information for the requesting user and users who are members of a given community of users.

In response to transmission of the UI request, step 814, which may be received by a UI service at a UI provider, a link is transmitted for accessing the requested UI, step 816. According to one embodiment, the UI service transmits the link for accessing the requested UI to the local PC, which may be conducted according to the same or a different transmission protocol utilized to transmit the UI request. The link to the user interface is forwarded to the client device, step 818, which may comprise the local PC executing an HTTP redirect to pass the link to the client device. Alternatively, the link may be encapsulated within a remote UI response from the local PC.

The client device receives the link that the local PC forwards, step 818, and attempts to use the link to access the UI service and retrieve the requested user interface, step 820. A check is performed to determine if a communications path exists over which the client device may to retrieve the user interface that the client device is requesting, step 822. Where the UI service is unavailable, step 822, the client device displays an error message to the user indicating that the UI service is unavailable, step 806. Where a communications path does not exist between the client device and the UI provider, step 820, the client device may use a local PC as a proxy for accessing the UI provider, step 822. Where the client device is able transmit the UI request to the UI provider, step 822, the UI is retrieved from the UI provider, step 824. According to one embodiment, the client device retrieves a 10 foot UI from the UI provider for display on a television or similar display device. Processing may return to step 814 when the client device requests a subsequent UI.

Figure 9:
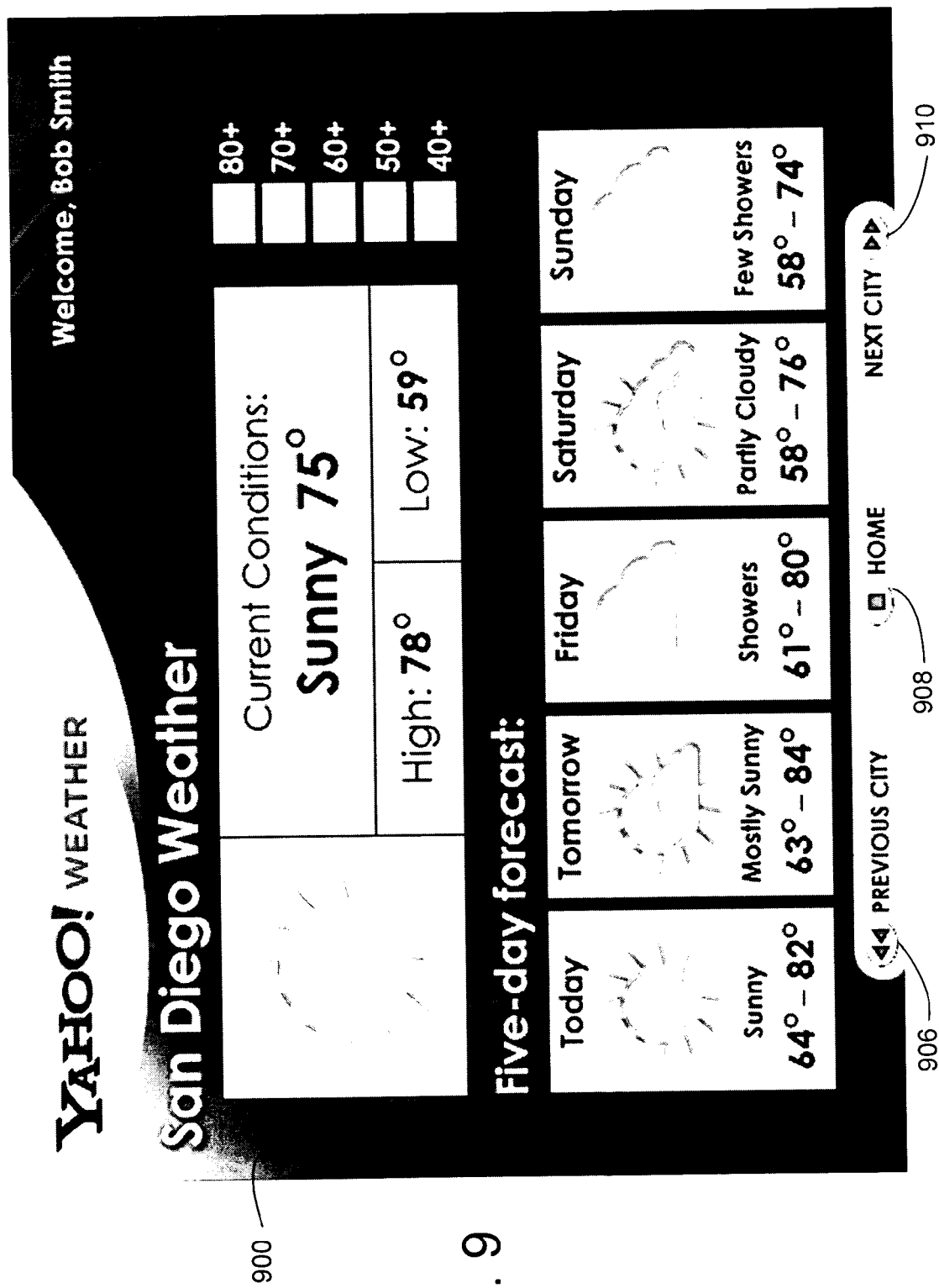
FIG. 9 is a screen diagram illustrating a network based user interface for the presentation of personalized weather information according to one embodiment of the present invention.
Figure 10:
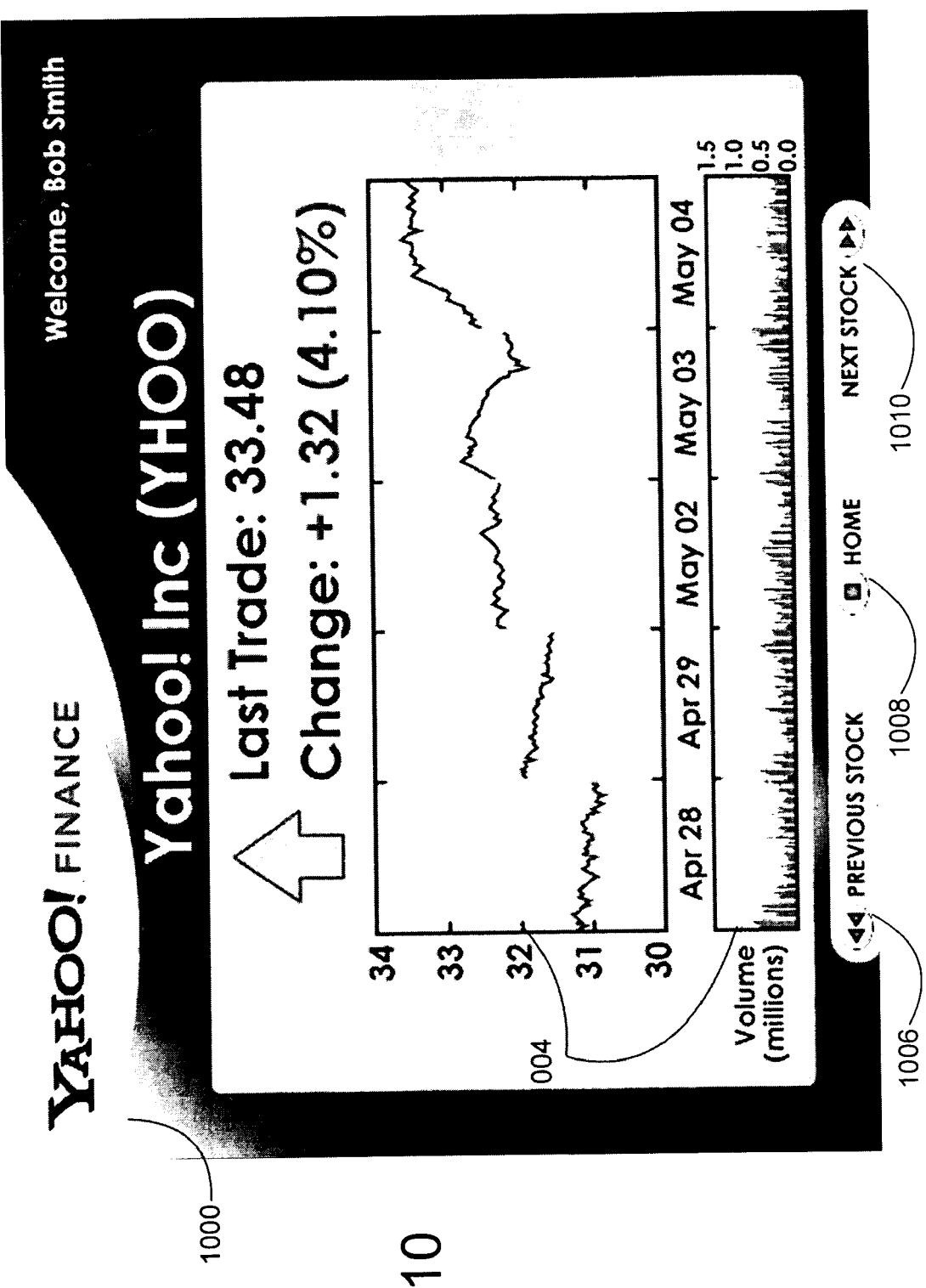
FIG. 10 is a screen diagram illustrating a network based user interface for the presentation of personalized financial information according to one embodiment of the present invention.

FIGS. 9 and 10 present screen diagrams illustrating two exemplary customized user interfaces that may be generated by the systems and methods of the present invention. According to the screen diagram of FIG. 9, a network-based user interface 900 is presented that provides customized weather information 904. The user interface 900 is customized for a given user 902, in the present embodiment the user Bob Smith. The weather information 904 in the interface may be generated using profile data for the given user or users in a given community of users, such as a social network of users related to the given user. The interface 900 also provides controls for navigating to other network based weather user interfaces 906 and 910, as well as a home page 908 user interface.

FIG. 10 presents another exemplary network-based user interface 1000 that provides customized financial information 1004. The user interface is again customized for a given user 1002, although generic or non-customized network-based user interfaces may be utilized. The financial information 1004 in the interface may be generated using profile data for the given user or users in a given community of users, such as a social network of users related to the given user. The interface 1000 also provides controls for navigating to other network based financial user interfaces 1006 and 1010, as well as a home page 1008 user interface.

Figure 11:
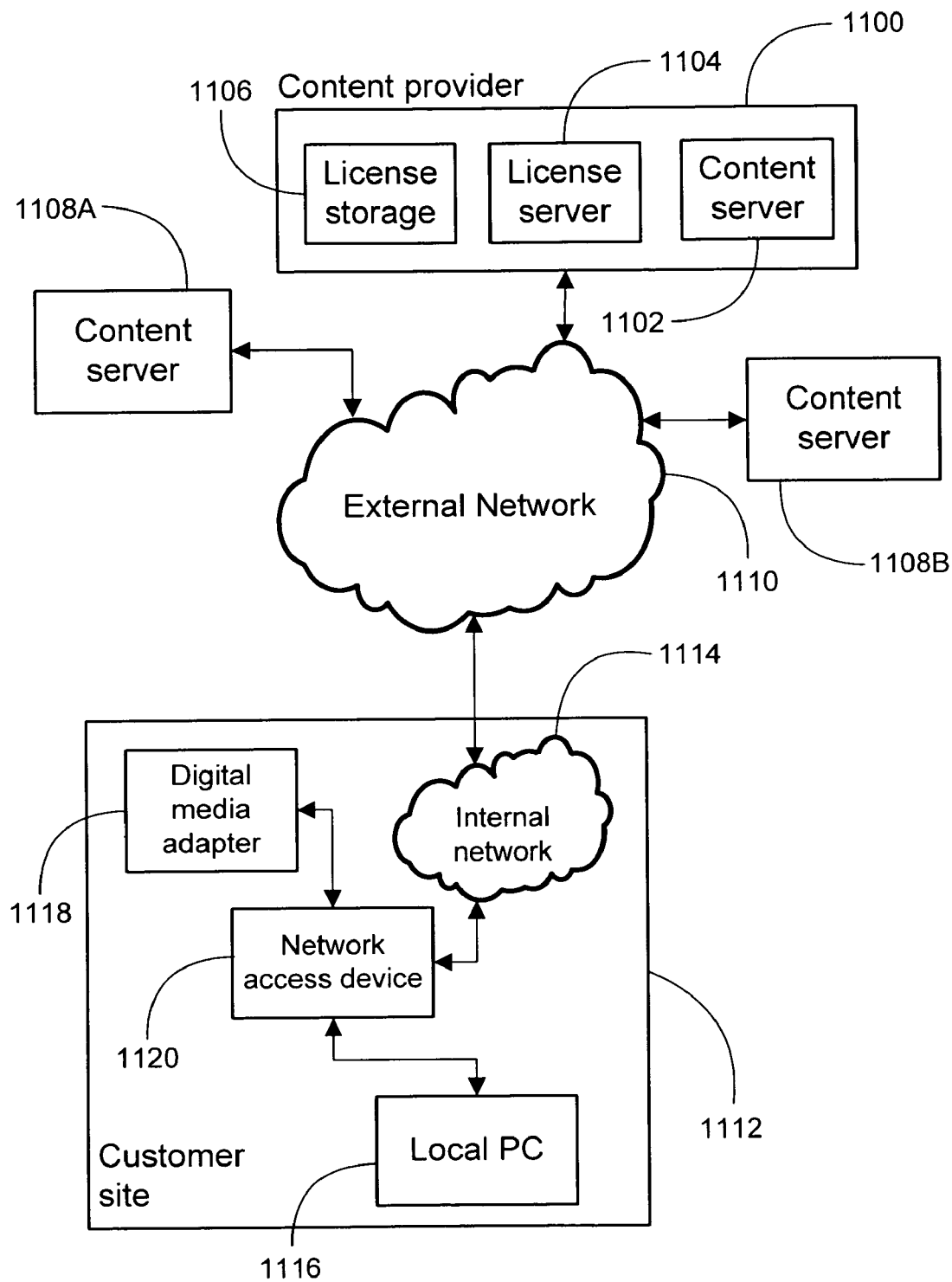
FIG. 11 is a block diagram illustrating a system for the distribution of DRM protected content to network devices.

In addition to utilizing the present invention for the distribution of services and content, including network based user interfaces, the present invention may also be utilized for the distribution of content protected by digital rights management access controls ("DRM") to UPnP client devices, as is illustrated by the system of FIG. 11. According to FIG. 11, content servers 1102, 1108A and 1108B are communicatively coupled to an external network 1110, which may comprise one or more local and wide area networks, e.g., the Internet. The content servers 1102, 1108A and 1108B are operative to distribute content to requesting clients utilizing DRM, thereby placing access controls on the content that the content servers distribute. It should be noted that the content servers 1102, 1108A and 1108B may distribute non-DRM protected content in conjunction with DRM protected content.

Most typical licensing schemes require that a client possess a valid license key in order to access the content protected by DRM access controls. Accordingly, a given content provider 1100 may comprise a license server 1104 and license data store 1106. The license server 1104 is operative to generate licenses that allow a client device to access DRM protected content, whereas the license data store 1106 provides persistent storage for a given user's licenses. Those of skill in the art recognize that the license server 1104 and license data store 1106 may be located at the customer site 1112 or on servers and data stores communicatively coupled to the external network 1110. According to one embodiment of the present invention, the licensing scheme used to control access to content is the Windows Media Digital Rights Management ("WMDRM") platform, which may limit access to playback of content to one personal computer, or a limited set of personal computers and portable devices, e.g., five.

The customer site comprises a number of devices including, but not limited to, an internal network 1114, a network access device 1120, a digital media adapter 1118 and a personal computer 1116 that is local to the customer site 1112. As described herein in conjunction with certain embodiments, which may be used in conjunction with the present embodiment, the network access device 1120 may comprise a content management system that provides directory services for devices on the internal network, allowing these devices to identify and access services and media sources, e.g., content servers 1102, 1108A and 1108B, that are both local and remote to the customer site. When a client device attached to the internal network 1114 attempts to access an item of content that is protected by DRM access controls, however, the client device must utilize the local PC 1116 to which the license for a given item of content is assigned. For example, assume that a given user purchases a license to playback a DRM protected content item on the local PC 1116. When the user attempts to access the DRM protected content item using the digital media adapter 1118, playback is prevented as the digital media adapter 1118 lacks the required license.

In order to overcome this limitation of the use of DRM protected content within an internal network 1114, a client device such as a digital media adapter 1118 first issues a request to the local PC for DRM protected content. The local PC 1116 receives the content request and contacts a given content server 1102, 1108A and 1108B to initiate transmission of a DRM protected content stream, which the local PC 1116 decrypts through the use of a license or similar certificate associated with the DRM protected content stream. The DRM protected content stream may be encoded using a first DRM licensing scheme, which according to one embodiment is WMDRM. The digital media adapter 1118 or other client device attached to the network access device 1120 also provides the local PC 1116 with a public encryption key. Public key encryption, also known as asymmetric cryptography, generates unique public/private key pairs of mathematically related numbers that are utilized to protect content. The public key is made available to anyone who wishes to use it, while its holder keeps the private key secret. Content encrypted with a given public key may only be decrypted by the corresponding private key, thereby ensuring the integrity of the encrypted content.

The local PC 1116 receives the DRM protected content, which it decrypts using the license key corresponding to the DRM protected content, as well as a public key from the digital media adapter 1118. The local PC 1116 re-encrypts the decrypted DRM protected content using the public key that it receives from the digital media adapter 1118. A public key may be used by the local PC 1116 to encrypt the DRM protected content according to a second DRM licensing scheme, which according to one embodiment of the invention is the Windows Media Digital Rights Management—Network Device ("WMDRM-ND") platform. The digital media adapter 1118 receives the re-encrypted content stream from the local PC 1116, which the digital media adapter 1118 decrypts using the private key that corresponds to the public key sent to the local PC 1116. The digital media adapter 1118 then commences playback of the DRM protected content stream transmitted from a given content server 1102, 1108A and 1108B.

Figure 12:
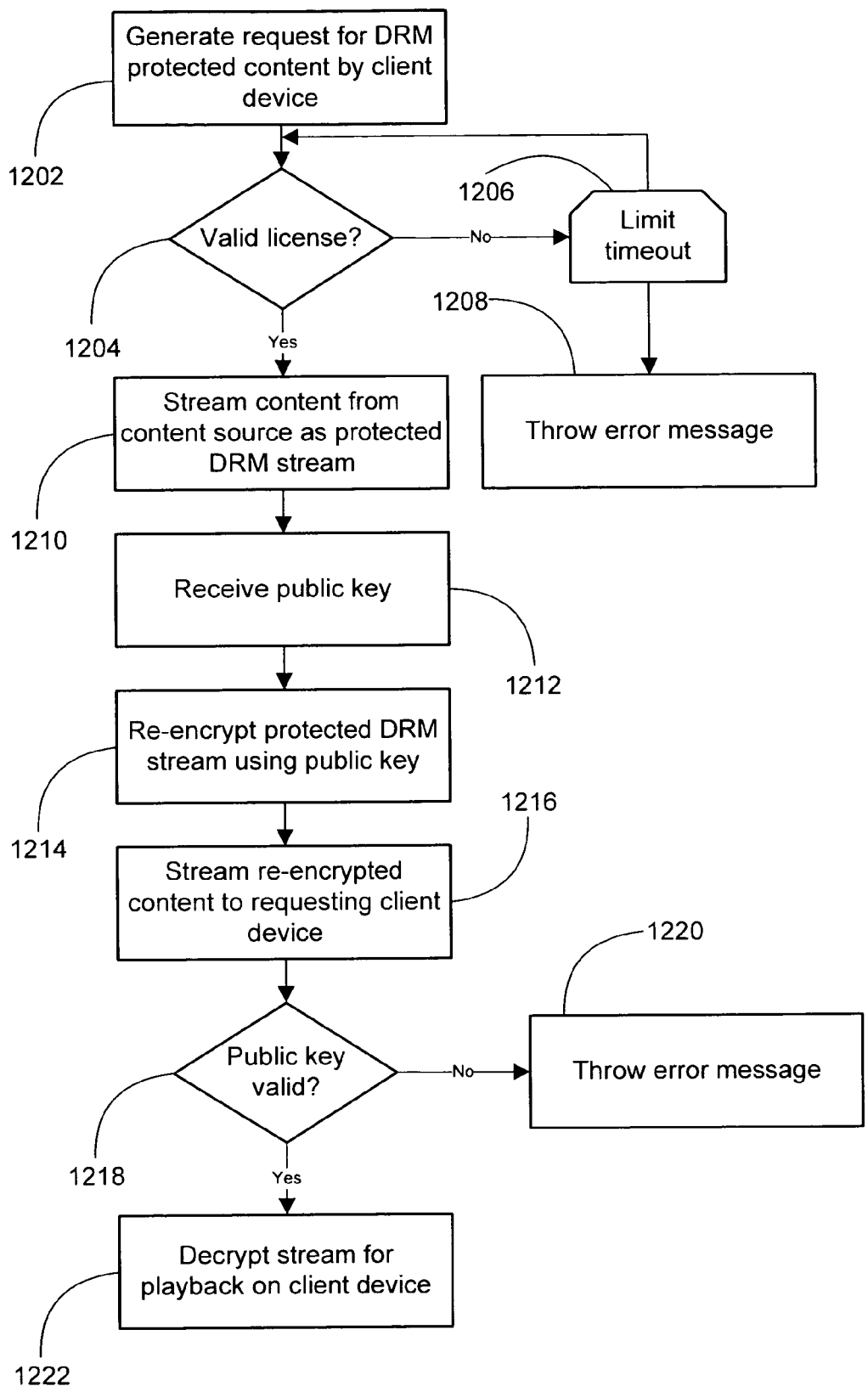
FIG. 12 is a flow diagram illustrating a method for the distribution of DRM protected content to network devices.

FIG. 12 presents a flow diagram illustrating one embodiment of a method for distributing DRM protected content to client devices communicatively coupled to a local network. According to the embodiment of FIG. 12, a request is generated by a client device for a content item protected by DRM access controls, step 1202. A check is performed to determine if a valid license exists for accessing the DRM protected content, step 1204. A valid license for accessing DRM protected content may reside at a customer site on a local data store or remote to the customer site, such as when maintained by a content provider or a license storage provider whereby a given user's content licenses reside on the network. The method continues to check for a valid license for the requested content, step 1204, until a limit is reached, step 1208. For example, a given number of locations may be checked for a valid license. When the limit is exceeded, step 1206, an error message is thrown to the client device for display to the user, step 1208.

Where a valid license is located or otherwise identified, step 1204, the requested content is streamed from a content source as a protected DRM stream, step 1210. According to one embodiment, the requested content is streamed from a content source to a personal computer local to a customer site using the WMDRM platform, although other DRM platforms know to those of skill in the art may be utilized. A public key is also received from a client device requesting the DRM protected content, step 1212. The received DRM protected content stream is re-encrypted using the public key, which may be performed by the local PC or other device in possession of a valid license for the DRM protected content stream. The re-encryption may be performed according to a second or disparate DRM platform from the first DRM platform utilized to provide DMR access controls for the DRM protected content stream. According to one embodiment, the DRM protected content stream is re-encrypted according to the WMDRM-ND DRM platform.

The re-encrypted content is streamed to the requesting client device, step 1216, e.g., the local PC transmits a re-encrypted content stream to the digital media adapter. A check is performed by the receiving client to determine if a valid public key was used to encrypt the stream, step 1218. The check may comprise attempting to decrypt the encrypted stream using the private key for the client device that corresponds to the public key for the client device. Where the client device's private key is not operative to decrypt the received stream, step 1218, the client device throws an error message for display to the user, step 1220. Where the stream is encrypted using a valid pubic key for the client device, step 1218, the client device decrypts the steam for playback, step 1222. For example, where the client device is a digital media adapter, playback may comprise presenting video content on a display device such as a television.

As stated above, it becomes increasingly difficult for a user to locate particular content items on a display limited UPnP client device where the amount of content items exceeds a certain threshold, e.g., number of content items in a CMS. According to one embodiment, the CMS maintains one or more content items according to a hierarchical index or tree of containers anchored at a root container, with each container in the tree comprising storage for one or more references to one or more content items. For example, where the CMS is operative to maintain an index of references to music content items, a root container in the hierarchical index may store an "albums" container, an "artists" container, a "songs" container and a "genre" container. Within each of the containers under the root container are one or more references to content items, which in the present example are music content items. Accordingly, within the "albums" container are references or links to albums metadata for content items that the CMS is indexing, with the "artists" container are references or links to artist metadata for content items that the CMS is indexing, etc.

As the number of content items contained within a given container grows, navigation becomes increasingly difficult. The present invention provides re-indexing schemes to reorder the references to content items that a CMS indexes, e.g., into a plurality of alphabetized containers within each of the containers contained within the root container. In a non-limiting example, embodiments of the present invention are described in terms of music content items. It should be appreciated by those of skill in the art that techniques described herein are applicable to other types and formats of content items, such as video content items and image content items.

Figure 13:
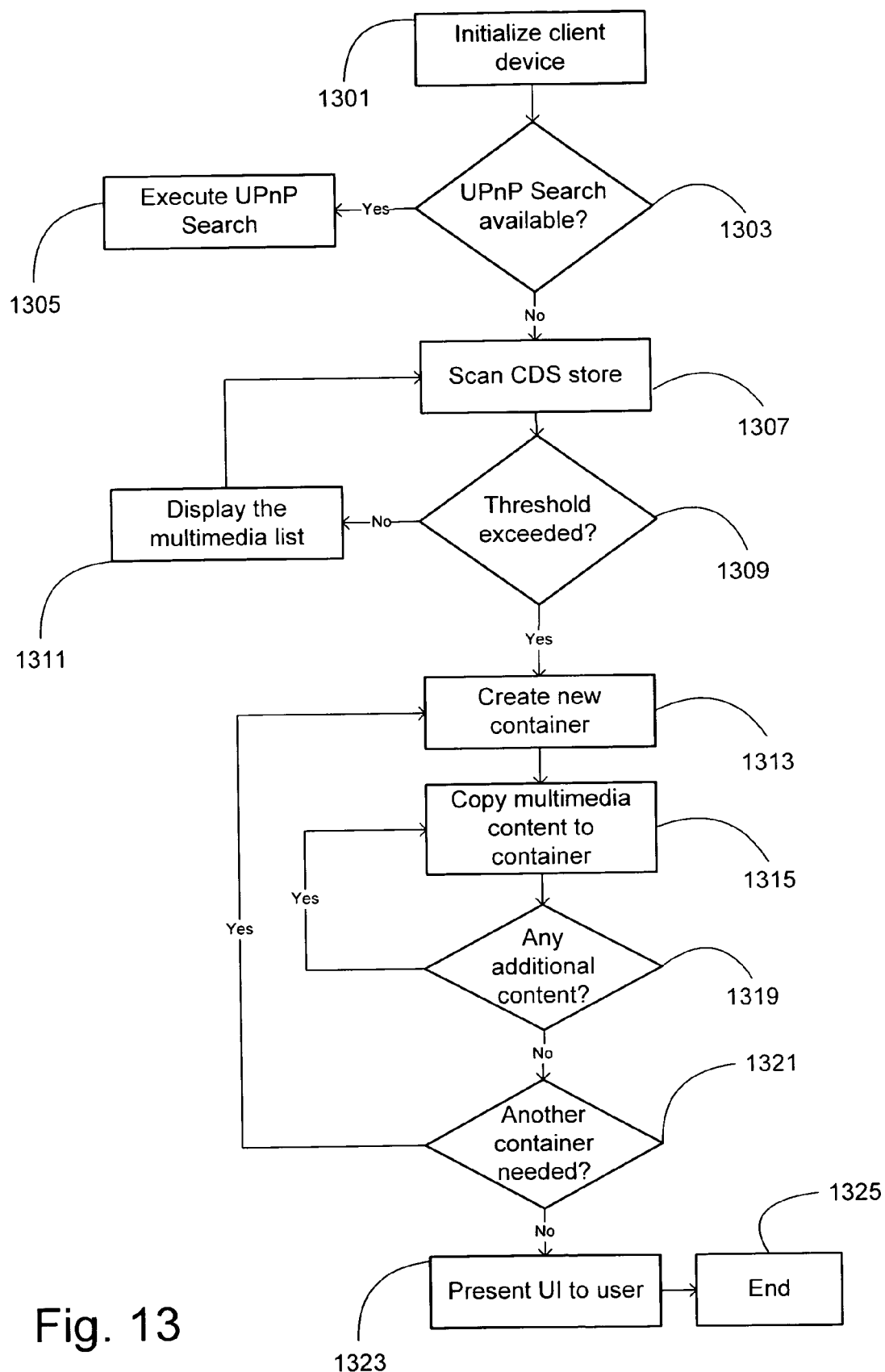
FIG. 13 is a flow diagram illustrating a method for re-indexing of references to content items within a content data store according to one embodiment of the present invention.

As stated above, embodiments of the present invention provide a CMS for the indexing of local and remote content items on the basis of one or more user profiles or preferences. FIG. 13 illustrates one embodiment of a method for re-indexing content that the CMS indexes for ease of management and navigation. The method begins with initialization of a client device, step 1301, which may include the client device broadcasting or transmitting descriptive information regarding the client device over a local network, e.g., where the client device is a UPnP digital media adapter, the client device may announce the presence of the digital media adapter to UPnP services or servers available on the local network. Descriptive information may also include information regarding the type and nature of the client device.

A check is performed to determine if UPnP Search services are available or enabled on both the client device and UPnP services and servers available to the client device, step 1303. If the client device is UPnP Search enabled and is attempting to connect to a service or server that supports UPnP Search, step 1303, a search query may be executed, step 1305, which may be executed according to techniques know to those of skill in the art.

If UPnP Search is unavailable, step 1303, the client device may directly browse references to content items in the CMS store using standard UPnP Browse techniques known to those of skill in the art. This causes the CMS store to query its internal indexes to determine the amount or number of content items that the CMS is indexing, step 1307. According to one embodiment, scanning of the CMS may comprise scanning through references to local and remote content that the CMS is indexing in accordance with a user profile or preference for the given user utilizing the CMS, as is described herein with regard to embodiments of the present invention.

A check is performed to determine if the number of content items in a given container that the CMS is indexing exceeds a numeric threshold, step 1309. If the number of content items (e.g., number if song content items) that the CMS is indexing is below the threshold, the CMS hierarchical index remains fixed and the browse response is made to the client device with the original unmodified list of items 1311. As a user or software process add references to additional content items to the CMS, which may be accomplished according to methods described herein, program flow returns to step 1307 to determine whether the number of content items in the given container exceeds the threshold. According to one embodiment, a give content provider may also identify category information in addition to a threshold whereby the threshold is only applied to content items that satisfy the criteria information, e.g., where a number of image content items are identified as high resolution images exceeds the threshold.

Upon exceeding the threshold, step 1309, a new container may be created according to a given container creation scheme, step 1313. According to one embodiment, where a alphabetical container creation scheme is implemented, a "browse by alphabet" or "alphabetical" container may be created within a "albums," "artists," "genre," etc. container, the containers forming a hierarchical tree. In one embodiment, the creation of containers may comprise creating at least one of folders or directories in the existing hierarchical index at the CMS according to techniques know to those of skill in the art. Similarly, where the container creation scheme is alphabetical, a container may be created within the "alphabetical container" that corresponds to a letter of the alphabet, e.g., an "A" container to hold references to content items that begin with the letter "A." References to content items that correspond to the newly created container are copied to the container, step 1315, such that the reference may be located at two or more points in the hierarchical index.

According to one embodiment, copying comprises referring or linking to metadata for a given content item within the CMS through the use of a reference or pointer. In this manner a single reference to a given content item may be associated with multiple containers in manner that is most suitable for presentation to the given client device. For example, in the case of responding to a client device with a two-line display, the same audio track may be browsed directly, e.g., via alphabetic index, via the album name or via the artist name. It should be appreciated that any given content may maintain one or more additional containers that further classify references to content items, such as by browsing a list of songs by according to a given artist, or a list of songs arranged alphabetically according to a given genre, irrespective of artist.

The creation of containers may be implemented according to one or more specified container creation schemes including, but not limited to, alphabetical order (containers storing reference to content items according to letters of the alphabet), chronological order (containers storing reference to content items according to dates), resolution order, size order, etc. It should be appreciated by those of skill in the art that according to one embodiment a "container" is a description of a object that holds other objects for the purpose of organizing items according to a logical order.

The various content creation schemes allow for the organization of references to content items according to one or more types of services provided or requested. For example, when utilizing an alphabetical container creation scheme, creating a container structure within a "songs" container such that the user may navigate to a given letter of the alphabet that corresponds to the first letter of a given song that the CMS is indexing. According to such a container structure, the user may navigate to a "B" container to quickly access the song "Beauty of My Dreams" by the group Phish.

A check is performed to determine if any references to additional content items exist in the CMS for copying to the newly created container, step 1319, e.g., any additional songs that begin with the letter "B" for copying to a "B" container in a "browse by alphabet" container, in a "songs" container under the root container. Where the check evaluates to true, program flow returns to step 1313 with additional content items copied to the container until all relevant content items are copied to the container, step 1319. Each copied content item may be first copied and re-indexed alphabetically within the container. Alternatively, alphabetical re-indexing may be executed after all relevant content items have been copied to the container.

Where there is no additional content that requires copying to the container, step 1319, a check is made to determine if an additional container is needed to further categorize of differentiate the content items that the CMS is indexing, step 1321. For example, where an initial container for storage of songs that begin with the letter "A" has been created and populated, a subsequent check may be performed to determine if the CMS is indexing any songs that begin with the letter "B" which, if true, causes the creation of a "B" container. Where the check at step 1321 evaluates to true, program flow returns to step 1313 with the creation of a new container. The categorization and naming convention of the containers and content stored therein may be based at least in part on one or more of a title or name of a given content item, artist name, genre type, playlist name, podcast name, etc.

Should the need for additional containers arise, e.g., to form a more detailed hierarchical index within the CMS, one or more additional container with corresponding content may be created until the need is satisfied, step 1313 through 1321. In one embodiment, the need for additional containers is determined by the CMS data store. Alternatively, or in conjunction with the foregoing, the methodology of the present invention provides a generic framework for any content publisher to specify both the nature of content that is indexed and the manner in which it is displayed, in addition to other properties including, but not limited to, display, localization, etc. For example, a publisher of music or song content items may chose to provide indexing that supports navigation for unlimited subscription tracks under an "all subscription tracks" container. Similarly, a provider of photo content items made available and which the CMS indexes may publish indexes according to date or according to resolution using specialized containers "Mar. 1, 2006 Photos" and "High Resolution Photos," respectively. It should be noted by those of skill in the art that the method of FIG. 13 may be implemented as one or more instructions maintained as software on persistent or transient storage media such that when executed by a programmable microprocessor, the software instructs the microprocessor to perform the method.

Figure 14:
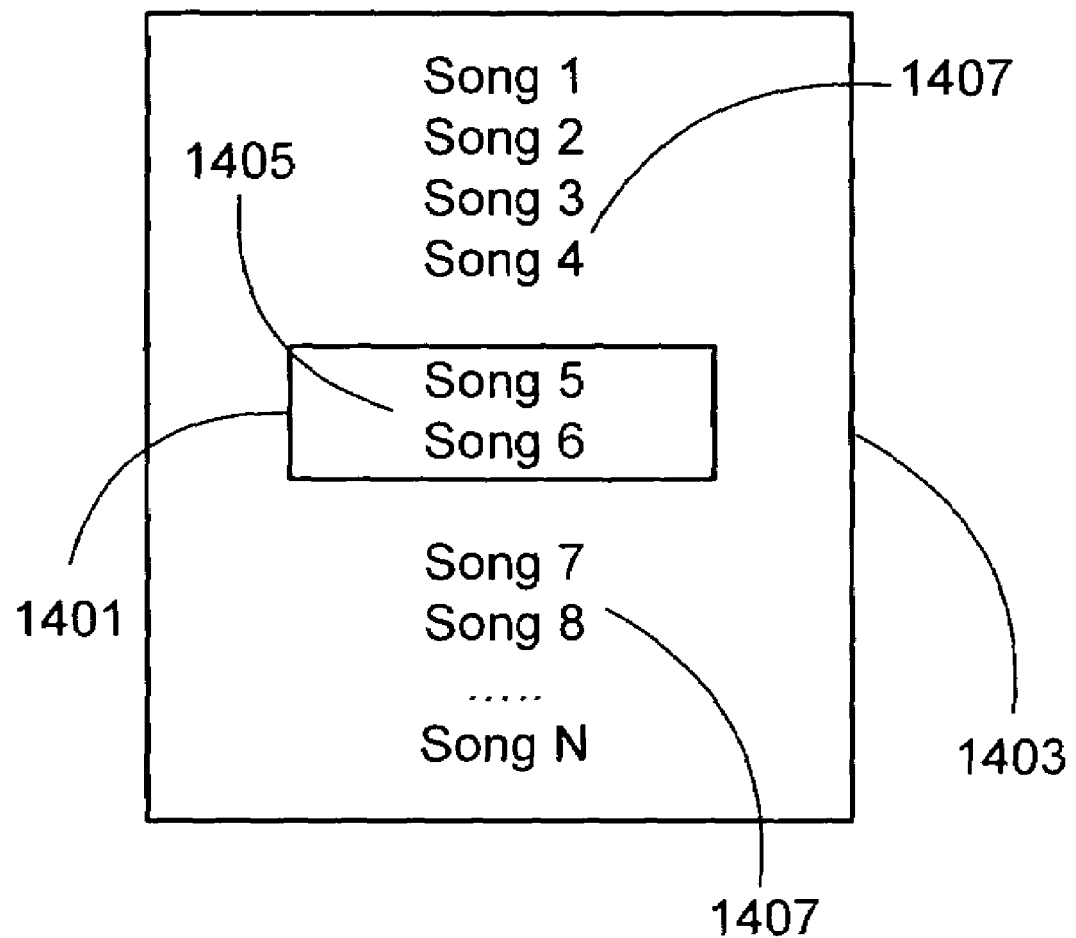
FIG. 14 is a block diagram illustrating a UPnP client device and navigation therewith according to one embodiment of the present invention.
Figure 15:
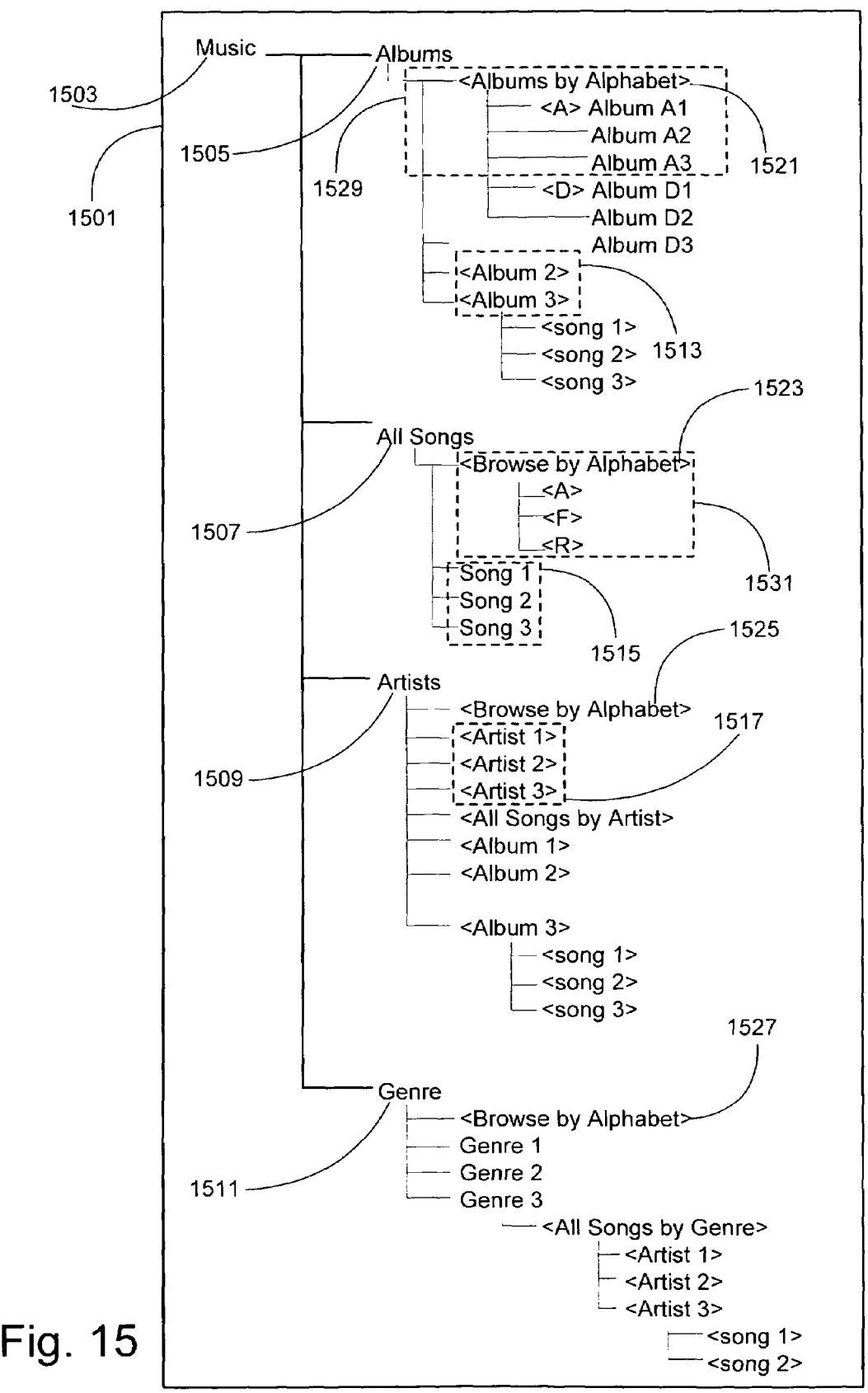
FIG. 15 is a data structure with references to content items re-indexed according to one embodiment of the present invention.

FIGS. 14 and 15 present a block diagram and data structure that illustrate data in the CMS and a index hierarchy of the CMS re-indexed according to the techniques of the present invention, respectively. According to the block diagram of FIG. 14, a UPnP client device 1403 comprises an interface window 1401 that displays a portion of the contents of a given container within the hierarchical index that the CMS maintains. As can be seen, the interface window 1401 is only capable of displaying a limited subset of references to content items 1405 from the set of content items in the given container. As can be seen from the exemplary client device 1403, a number of content items are in the container that the user is navigating but not visible, 1407 and 1409, through the interface window 1401. Using an input device, such as a remote control, the user must scroll through the set of content items in the container 1405, 1407 and 1409 to locate a desired content item.

FIG. 15 presents an exemplary data structure where the contents of a CMS are re-indexed according to the techniques described in connection with various embodiments of the present invention. According to the index 1501 that the CMS maintains, a hierarchical data structure is a tree with a root note 1503, which in this example is "music". Accordingly, the index structure is directed to managing references to music content items. Those of skill in the art recognize that the index may maintain references to other types and formats of content items, both with and without the contents of the exemplary index 1501. According to one embodiment, the tree hierarchy as described herein is only a logical arrangement of items and containers that is created for the purpose of making a response to a device and that the CMS maintains the content objects and metadata associated therewith.

Below the root node 1403, which is a container for storing data, are one or more other containers and content items, as a given container may maintain data, another container or combinations thereof. According to the exemplary index 1501, the root node 1503 maintains a plurality of containers directed to organizing music content items including, but not limited to, "albums" 1505, "all songs" 1507, "artists" 1509 and "genre" 1511. A given container 1505, 1507, 1509 and 1511 maintains zero or more references to items of content 1513, 1315, and 1517, respectively. As discussed above, a check is performed to determine whether the amount of data in the CMS exceeds a threshold. Crossing of a threshold may be determined according to the total contents of the index 1501, or alternatively may be according to the number of content items in a given container 1505, 1507, 1509 and 1511. Where the number of content items exceeds a threshold, re-indexing is executed on the index 1501.

According to the present embodiment, a container creation scheme involves the re-indexing of the index 1501 according to alphabetical order. Within a given container 1505, 1507, 1509 and 1511 under the root node 1503, a "browse by alphabet" container is generated and maintained 1521, 1523, 1525 and 1527, respectively. A given browse by alphabet container 1521, 1523, 1525 and 1527 maintains one or more letter containers, each of which maintain one or more content items 1529 and 1531. For example, in the albums container 1505 are several references to album content items 1513, e.g., a collection of related music content items. Accordingly, the browse by alphabet container 1521 maintains containers that correspond to a letter in the title of a given album content items, e.g., albums starting with the letter "A" are linked to the "A" container, albums starting with the letter "B" are linked to the "B" container, etc. The re-indexed CMS 1501 provides the user with a new navigation opportunity—instead of necessarily having to traverse a long, unwieldy list of content items, the user may navigate to a container that contains content items by alphabetically.

In another embodiment, this content hierarchy described in FIG. 15 may be individually tailored for the given device and generated dynamically at request time. For example, a given UPnP client device that displays track numbers may receive a list of audio tracks arranged according to album track number, whereas a UPnP client device that displays a generic list of tracks may receive an alphabetically sorted list of tracks. It should be noted that the content creation scheme that the CMS employs does not necessarily depend on the UPnP client device making an explicit request, but may utilize knowledge regarding the nature and type of UPnP client device generating the request. It should be further appreciated by those of skill in the art that rules may also defined by a given content provider or generated on the basis of user preferences or properties. For example, if the user is determined as a minor by an existing rule, the response may be tailored to present only selective and appropriate content for this user in accordance with the techniques described herein.

FIGS. 1-15 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for re-indexing content items made available by one or more Universal Plug and Play (UPnP) servers or services, the method comprising:
   creating, using a processor, a root container for storage of one or more references to one or more content items;
   creating, using the processor, a new container within the root container in accordance with one or more container creation schemes wherein at least one of the one or more container creation schemes is determined by a content provider utilizing properties received from the content provider to determine a container hierarchy for a Content Management System (CMS);
   copying one or more links to the one or more references to the new container from the one or more UPnP servers or services;
   determining, using the processor, a need for another new container when an indexing exceeds a numeric threshold; where there is a need for the another new container, creating the another new container within the root container in accordance with a given content creation scheme;
   copying the one or more links to the one or more references to the another new container;
   re-indexing at least one of the one or more container creation schemes to reorder the one or more references to the one or more content items into a plurality of containers within the root container.

2. The method of claim 1 comprising selecting the given content creation scheme from a set of content creation schemes including alphabetical, chronological, date, resolution and size.

3. The method of claim 1 wherein copying to the new container comprises copying in accordance with one or more content item properties selected from a set of properties including file name, artist name, genre type, playlist name and podcast name.

4. the method of claim 1, wherein copying to the new container comprises copying a reference to a given content item in multiple containers.

5. The method of claim 1 wherein creating the root container comprises utilizing one or more user preferences to determine the given content creation scheme.

6. The method of claim 1, wherein creating the root container comprises utilizing one or more properties of a client device to determine the given content creation scheme.

7. The method of claim 1, wherein creating the root container comprises utilizing one or more rules to generate the given content creation scheme.

8. The method of claim 7 wherein utilizing one or more rules comprises utilizing one or more rules that are local to the Content Management System (CMS).

9. The method of claim 7 wherein utilizing one or more rules comprises utilizing one or more rules that are remote to the Content Management System (CMS).

10. The method of claim 7 wherein utilizing one or more rules comprises dynamically applying the one or more rules upon receipt of a request from a client device.

* * * * *